United States Patent [19]
Ueda

[11] Patent Number: 6,016,189
[45] Date of Patent: Jan. 18, 2000

[54] PORTABLE IMAGE FORMING APPARATUS USING PHOTOSENSITIVE RECORDING MEDIUM

[75] Inventor: Masashi Ueda, Nagoya, Japan

[73] Assignee: Brother Kogyo Kabushiki Kaisha, Nagoya, Japan

[21] Appl. No.: 08/935,823

[22] Filed: Sep. 23, 1997

[30] Foreign Application Priority Data

Sep. 25, 1996 [JP] Japan .................................. 8-253139
Sep. 25, 1996 [JP] Japan .................................. 8-253149
Sep. 25, 1996 [JP] Japan .................................. 8-253159

[51] Int. Cl.[7] .................................................. G03B 27/00
[52] U.S. Cl. .......................... 355/402; 355/406; 355/78; 347/262
[58] Field of Search ..................................... 355/400, 402, 355/403, 404, 406, 78, 91, 93, 113, 122, 124; 347/221, 239, 262, 263; 349/4

[56] References Cited

U.S. PATENT DOCUMENTS

| | | | |
|---|---|---|---|
| 4,786,948 | 11/1988 | Matsui | 355/78 |
| 5,049,902 | 9/1991 | Duke | 346/108 |
| 5,843,615 | 12/1998 | Popat et al. | 355/400 |

FOREIGN PATENT DOCUMENTS

| | | |
|---|---|---|
| B2 59-41227 | 10/1984 | Japan . |
| 4-331944 | 11/1992 | Japan . |

*Primary Examiner*—Alan A. Mathews
*Attorney, Agent, or Firm*—Oliff & Berridge, PLC

[57] ABSTRACT

Disclosed is the image forming apparatus 1 in which, when the image displayed on the display 31 of the other electronic apparatus 30 is formed on the microcapsule sheet 2, the LC shutter 9 is opened for a predetermined time while contacting the display 31 to the contact plane A of the image forming apparatus 1 and light is irradiated on the microcapsule sheet 2 from the display 31, thereby, the desirable image is formed on the image forming layer 13 of the microcapsule sheet 2 according to the image displayed on the display 31.

26 Claims, 18 Drawing Sheets

FIG.10(B)

| S1  | JUDGE ON/OFF STATE OF SHEET SENSORS 4, 5 |
|-----|------------------------------------------|
| S2  | WARNING SOUND |
| S3  | DISPLAY IMAGE TO BE PRINTED ON DISPLAY OF OTHER APPARATUS |
| S4  | CONTACT CONTACT PLANE A TO LC SHUTTER |
| S5  | INSTRUCTION BUTTON IS PRESSED ? |
| S6  | ALL DETECTING BUTTONS ARE ON ? |
| S7  | WARNING SOUND |
| S8  | OPEN LC SHUTTER FOR A PREDETERMINED TIME |
| S9  | TERMINATION SOUND |
| S10 | DERIVE MICROCAPSULE SHEET FROM STORAGE CASE |

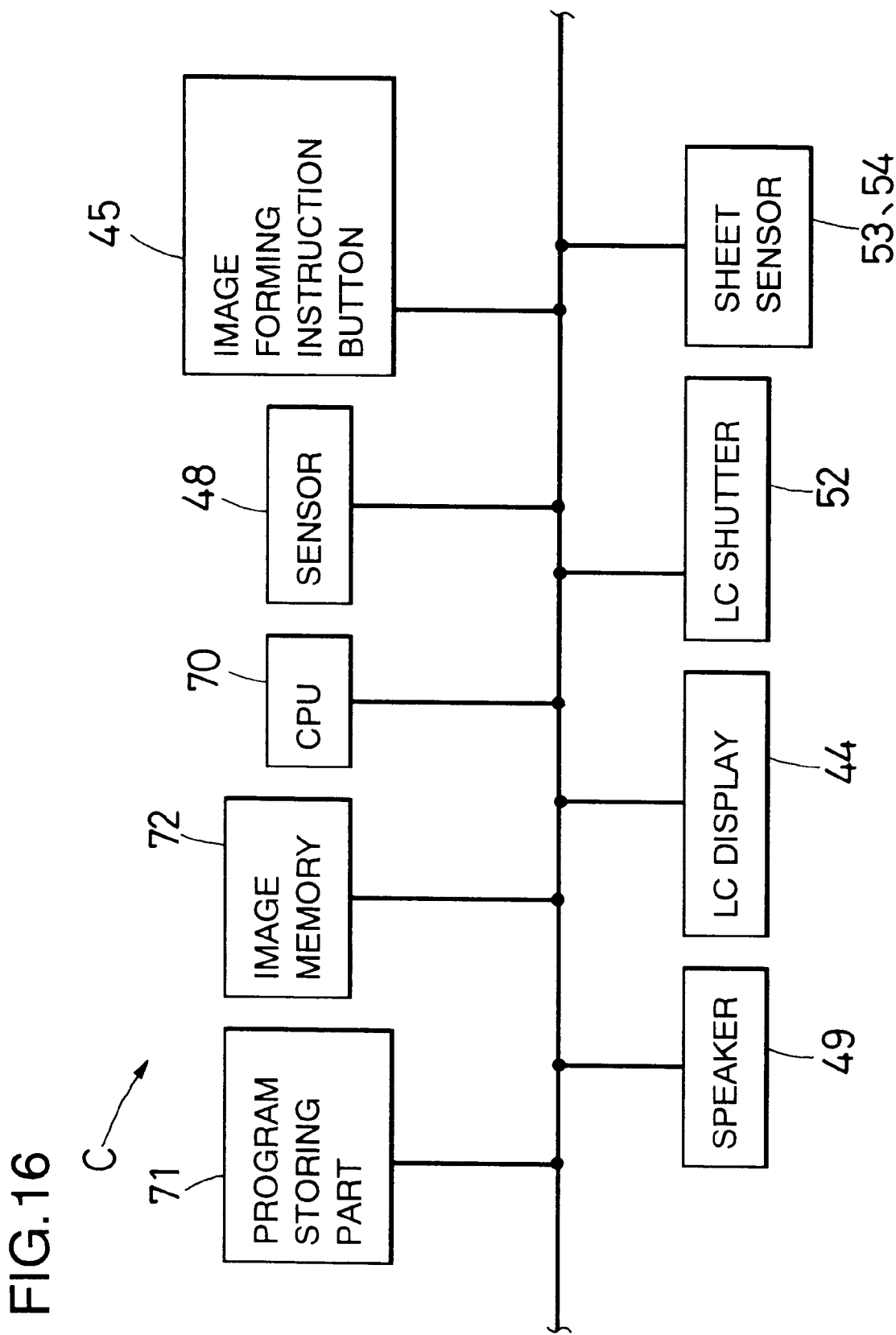

FIG.17(B)

| S11 | DISPLAY IMAGE DATA ON LC DISPLAY |
|---|---|
| S12 | INSTRUCTION BUTTON IS PRESSED ? |
| S13 | JUDGE ON/OFF STATE OF SHEET SENSORS |
| S14 | DISPLAY MESSAGE "MICROCAPSULE SHEET IS STORED WITH TOP AND BOTTOM REVERSION. PLEASE RESET MICROCAPSULE SHEET." |
| S15 | DISPLAY MESSAGE "PLEASE SET MICROCAPSULE SHEET." |
| S16 | REVERSE IMAGE DATA, PREPARE MIRROR IMAGE AND SET MIRROR MODE ON |
| S27 | SET MIRROR MODE OFF |
| S17 | SENSOR IS ON OR OFF ? |
| S18 | DISPLAY MESSAGE "PLEASE CLOSE LID MEMBER." |
| S19 | SWITCH LC DISPLAY IN DARK STATE AND RECOGNIZE START OF EXPOSURE |
| S28 | LOCK LID MEMBER TO MAIN BODY |
| S20 | OPEN LC SHUTTER |
| S29 | JUDGE MIRROR MODE |
| S30 | READ OUT IMAGE DATA PREPARED IN S11 |
| S31 | READ OUT IMAGE DATA PREPARED IN S16 |
| S21 | DISPLAY IMAGE DATA ON LC DISPLAY FOR A PREDETERMINED TIME |
| S22 | SWITCH LC DISPLAY IN DARK STATE AND RECOGNIZE TERMINATION OF EXPOSURE |
| S23 | CLOSE LC SHUTTER |
| S24 | TERMINATION SOUND |
| S25 | DERIVE MICROCAPSULE SHEET FROM STORAGE PART |
| S26 | RELEASE LOCK OF LID MEMBER |

FIG.20(B)

| | |
|---|---|
| S41 | DISPLAY IMAGE DATA ON LC DISPLAY |
| S42 | INSTRUCTION BUTTON IS PRESSED ? |
| S43 | SENSOR IS ON ? |
| S44 | DISPLAY MESSAGE " PLEASE CLOSE LID MEMBER." |
| S45 | STORE IMAGE DATA, SWITCH LC DISPLAY IN DARK STATE AND RECOGNIZE START OF EXPOSURE |
| S46 | COLOR CONVERSION |
| S47 | OPEN LC SHUTTER AND LOCK LID MEMBER |
| S48 | DISPLAY IMAGE DATA ON LC DISPLAY FOR A PREDETERMINED TIME |
| S49 | STORE IMAGE DATA, SWITCH LC DISPLAY IN DARK STATE AND RECOGNIZE TERMINATION OF EXPOSURE |
| S50 | CLOSE LC SHUTTER |
| S51 | WARNING SOUND |
| S52 | DERIVE MICROCAPSULE SHEET FROM STORAGE PART |
| S53 | READ OUT IMAGE DATA BEFORE COLOR CONVERSION |
| S54 | RECOVER IMAGE DATA IN PREVIOUS STATE |
| S55 | RELEASE LOCK OF LID MEMBER |

PORTABLE IMAGE FORMING APPARATUS USING PHOTOSENSITIVE RECORDING MEDIUM

BACKGROUND OF THE INVENTION

1. Field of the Invention

The present invention relates to an image forming apparatus in which a photo-sensitive recording medium having a photo-sensitive image forming layer thereon is utilized and a desirable image is formed on the photo-sensitive recording medium by irradiating light from an image display of the other image displaying apparatus. In particular, the present invention relates to an image forming apparatus through which a desirable image can be obtained on the photo-sensitive recording medium by simple operation to contact an image display of the other image displaying apparatus to the image forming apparatus and a size thereof can be miniaturized with low cost and high portability.

The present invention relates to an image forming apparatus having an image display capable of displaying various image information, through which a desirable image can be obtained on the photo-sensitive recording medium by simple operation to contact the photo-sensitive recording medium to the image display of the image forming apparatus and a size thereof can be miniaturized with low cost and high portability.

The present invention relates to an image forming apparatus having an image display capable of displaying various image information, in which a display mode of an image displayed on the image display is changed on the basis of a non-contact state that a photo-sensitive recording medium is not contacted to the image display and a contact state that the photo-sensitive recording medium is contacted to the image display, thereby the beautiful image can be reproduced in both of one case that the image is seen on the image display and the other case that the image is seen on the photo-sensitive medium after formed thereon.

2. Description of Related Art (1) It is, conventionally, popularized various portable electronic apparatuses (for example, an electronic notebook, a video apparatus, etc.) having an image display on which various information input through an input device such as a keyboard or taken therein from an outer device is displayed. In the portable electronic apparatuses, though the image display is used for informing the image data processed in the apparatus to a user thereof, there remains, for example, a request for printing the image information on the print medium and informing thereof to the third person, as the means for easily informing the image information.

Under the above circumstance, in case that the various information stored in the above electronic apparatuses is printed on the print medium, the information is, for example, printed by a printing device in a wordprocessor after connected thereto and by a printer after connected to a personal computer.

However, in the above case to print the information of the portable electronic apparatus by the printing device in wordprocessor or the printer of personal computer, the information cannot be printed after carrying them near the place where the wordprocessor or personal computer is installed and connecting thereto. Therefore, it concludes that the various information of the electronic apparatuses cannot be printed at the desirable time and place.

Taking the above into consideration, it is very convenient if an apparatus by which the information stored in the electronic apparatuses can print regardless of time and place is realized, and thus it is desired such image print apparatus with high portability to efficiently utilize the portability.

(2) Further, as the print method used in the printing device of the wordprocessor or in the printer controlled by the personal computer, it is generally adopted, for example, silver salt process, electrophtography process, ink jet process or thermal printing process. In each print method, it is necessary a comparatively complex print mechanism. For example, it is necessary development liquid and development process mechanism in the silver salt process, photo-sensitive drum, laser irradiating mechanism and toner device in the electrophotograpgy process, ink jet mechanism and ink supply mechanism in the ink jet process, and thermal head and ink ribbon supply mechanism in the thermal printing process.

Therefore, in the printing devices utilizing the above print methods, the size thereof becomes inevitably large-scale on the basis of characteristic of the print method, thus it is difficult to realize a small printing device with high portability (3) As mentioned, it is, conventionally, popularized various portable electronic apparatuses (for example, an electronic notebook, a video apparatus, etc.) having an image display on which various information input through an input device such as a keyboard or taken therein from an outer device is displayed. Recently, it is generalized in the image display of the above portable electronic apparatus that the image is displayed with full-color when image data is displayed. At that time, if the color image data is displayed on the image display, various adjustment in color characteristic is conducted so that preferable image is reproduced when the user sees it. For example, if the full-color image is reproduced by using three colors (red, green and blue) or each of primary colors is reproduced at the same extent, color adjustment is conducted so that the image is wholly recognized in gray or so that a relationship between gradation level and luminous strength becomes non-linear to match with person's vision.

Among the above electronic apparatuses, there exist apparatuses having information communicating function through which apparatuses can mutually communicate. However, it is not yet enough to unifiably communicate between the apparatuses produced by various makers, therefore it is necessary to exchange information stored in the apparatuses after printing on the recording sheet. Under this circumstance, if the full-color image displayed on the display is formed on the photo-sensitive recording medium, the full-color image is formed by exposing the photo-sensitive recording medium according to the full-color image displayed on the display.

However, though the full-color image is displayed on the display so as to be preferably reproduced for person's vision characteristic, person's color vision characteristic and color photosensitivity of the photo-sensitive recording medium are mutually different and there is a characteristic gap therebetween. Therefore, even if a person feels beautiful to see the full-color image on the display, there is a case that the full-color image cannot be reproduced due to the above gap on the photo-sensitive recording medium in a preferable state for person's vision when the full-color image is formed by exposing and developing thereof. Further, color reproducing ability of the display installed in the apparatus and color reproducing ability of the photo-sensitive recording medium are generally different, thus there is a case that color difference exists between the color image displayed on the display and the color image formed on the photo-sensitive recording medium.

SUMMARY OF THE INVENTION

Accordingly, it is the first object of the present invention to overcome the above problems and to provide an image forming apparatus through which a desirable image can be obtained on the photo-sensitive recording medium by simple operation to contact an image display of the other image displaying apparatus to the image forming apparatus and a size thereof can be miniaturized with low cost and high portability.

Further, it is the second object of the present invention to provide an image forming apparatus having an image display capable of displaying various image information, through which a desirable image can be obtained on the photo-sensitive recording medium by simple operation to contact the photo-sensitive recording medium to the image display of the image forming apparatus and a size thereof can be miniaturized with low cost and high portability.

Furthermore, it is the third object of the present invention to provide an image forming apparatus having an image display capable of displaying various image information, in which a display mode of an image displayed on the image display is changed on the basis of a non-contact state that a photo-sensitive recording medium is not contacted to the image display and a contact state that the photo-sensitive recording medium is contacted to the image display, thereby the beautiful image can be reproduced in both of one case that the image is seen on the image display and the other case that the image is seen on the photo-sensitive medium after being formed thereon.

To accomplish the above objects, the present invention provides an image forming apparatus comprising:

a main body for storing a photo-sensitive recording medium on which a photo-sensitive image forming layer is formed;

a contact plane on which an image display of the other apparatus is contacted, the contact plane being formed on the main body;

a control device for controlling light quantity irradiated on the photo-sensitive recording medium from the image display of the other apparatus according to an image displayed thereon, the control device being arranged on the contact plane; and image forming means for forming the image on the photo-sensitive image forming layer on the basis of light irradiated thereon while controlling light quantity by the control device and contacting the image display to the contact plane.

In the image forming apparatus claimed in claim 1, if the image displayed on the image display of the other apparatus is formed, light is irradiated on the photo-sensitive recording medium from the image display while controlling light quantity by the control device and contacting the image display to the contact plane. Thereby, corresponding to the image displayed on the image display of the other apparatus, the image is formed on the photo-sensitive image forming layer of the recording medium according to the image displayed on the image display. In this way, the image corresponding to the image displayed on the image display can be easily formed on the photo-sensitive recording medium by simple operation to contact the image display of the other apparatus to the contact plane of the image forming apparatus. Further, since it is not necessary to install a special construction for irradiating the image on the photo-sensitive recording medium, the apparatus can be miniaturized with low cost.

Thus, it can realize the image forming apparatus with high portability through which the image displayed on the display of the other apparatus can be easily printed regardless of time and place. Further, light quantity irradiated from the image display on the photo-sensitive recording medium is controlled by the control device, thereby light corresponding only to the desirable image displayed on the image display can be selectively irradiated on the photo-sensitive recording medium, thus the image with high quality can be obtained while improving operation efficiency of image printing.

Further, the present invention provides an image forming apparatus comprising:

a storing member for storing a photo-sensitive recording medium on which a photo-sensitive image forming layer is formed;

image display for displaying an image thereon, the image display being arranged on a main body;

a fixing device for fixing the photo-sensitive recording medium to the image display while mutually contacting both the photo-sensitive recording medium and the image display;

a control device for controlling light quantity irradiated on the photo-sensitive recording medium from the image display according to the image displayed thereon, the control device being arranged on the storing member; and image forming means for forming an image on the photo-sensitive image forming layer on the basis of light irradiated thereon while controlling light quantity by the control device.

In the image forming apparatus, when the image displayed on the image display is formed on the photo-sensitive recording medium, light is irradiated on the photo-sensitive recording medium from the image display while controlling light quantity by the control device and contacting the photo-sensitive recording medium to the image display. Thereby, corresponding to the image displayed on the image display, the image is formed on the photo-sensitive image forming layer of the recording medium according to the image displayed on the image display. In this way, the image corresponding to the image displayed on the image display can be easily formed on the photo-sensitive recording medium by simple operation to contact the photo-sensitive recording medium to the image display. Further, since it is not necessary to install a special construction for irradiating the image on the photo-sensitive recording medium, the apparatus can be miniaturized with low cost.

Further, since the photo-sensitive recording medium and the image display are mutually contacted by the fixing device in image forming, it can prevent the image formed on the photo-sensitive image forming layer from being fluctuated and blurred, thus it can obtain the image with high quality. Since light quantity irradiated on the photo-sensitive recording medium from the image display can be controlled by the control device, it can certainly prevent light except the light corresponding to the desirable image from being irradiated on the photo-sensitive recording medium, thereby only the desirable image can be correctly formed on the recording medium.

Further, the present invention provides an image forming apparatus comprising:

a storing member for storing a photo-sensitive recording medium on which a photo-sensitive image forming layer is formed;

image data storing means for storing image data of an image to be formed on the photo-sensitive image forming layer;

image display for displaying the image data stored in the image data storing means thereon, the image display being arranged on a main body;

a fixing device for fixing the photo-sensitive recording medium to the image display while mutually contacting both the photo-sensitive recording medium and the image display a light control device for controlling light quantity irradiated on the photo-sensitive recording medium from the image display according to the image displayed thereon, the control device being arranged on the storing member; and display control means for controlling the image display to display the image data according to a first display mode when the photo-sensitive recording medium is not contacted to the display means and to display the image data according to a second display mode when the photo-sensitive recording medium is contacted to the image display.

In the image forming apparatus, when the image data stored in the image data storing means is displayed on the image display, the image data is displayed on the image display according to the first display mode under the condition that the photo-sensitive recording medium is not contacted to the image display. Here, the first display mode is a display mode that the image data is displayed on the image display so as to match with person's vision characteristic, thus, the image data is beautifully reproduced on the image display under the first display mode.

When the image data is formed on the image forming layer of the photo-sensitive recording medium, the photo-sensitive recording medium is contacted to the image display. On the basis of this contact, the image data is displayed on the image display according to the second display mode. Here, the second display mode is a display mode that the image data is displayed on the image display so that the image matches with person's vision characteristic and is formed on the image forming layer 13 of the photo-sensitive recording medium, when the image is formed on the image forming layer according to the image data. Further, light is irradiated on the photo-sensitive recording medium from the image display under the condition that the photo-sensitive recording medium is contacted and fixed to the image display by the fixing device while controlling light quantity through the light control device. Thereby, the image is formed on the image forming layer of the photo-sensitive recording medium, corresponding to the image data displayed on the image display. At that time, on the image display the image data is displayed according to the second display mode so that the image matches with person's vision characteristic and is formed on the image forming layer, thus the image formed on the photo-sensitive recording medium according to the image displayed on the image display becomes beautiful in matching with person's vision characteristic.

In this way, in the image forming apparatus, the beautiful image can be reproduced in both of one case that the image is seen on the image display and the other case that the image is seen on the photo-sensitive recording medium.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the accompanying drawings, wherein:

FIG. 16 is a block diagram showing control system of the image forming apparatus according to the second embodiment FIGS. 17(A), (B) show a flowchart of main program to process the image forming apparatus according to the second embodiment;

DETAILED DESCRIPTION OF THE PREFERRED EMBODIMENTS

Figure 1:
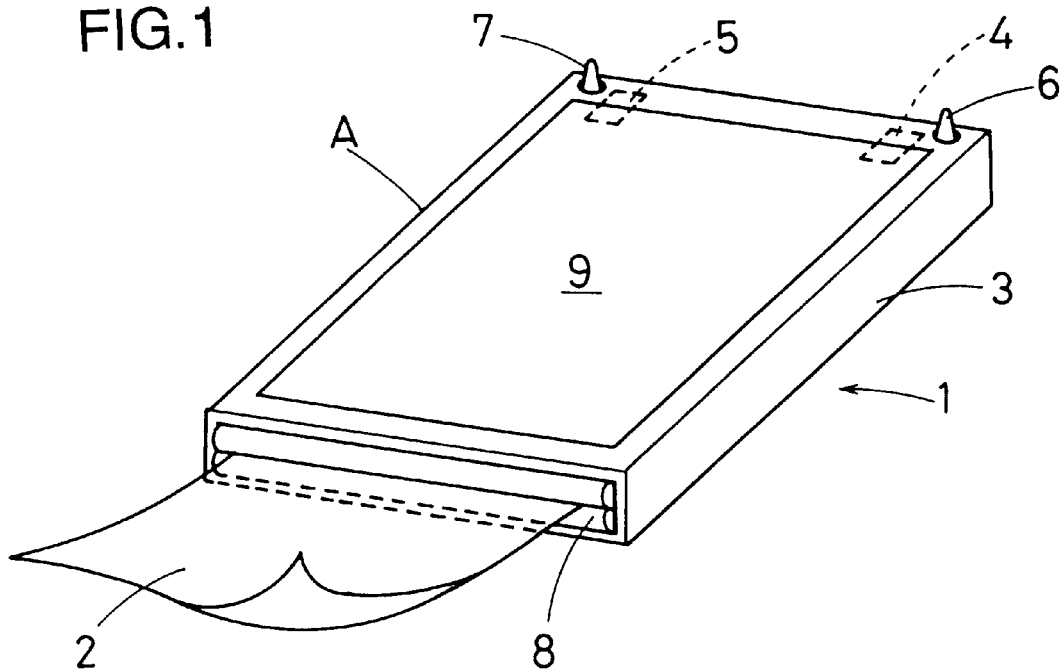
FIG. 1 is a perspective view showing an upper side of the image forming apparatus according to the first embodiment.
Figure 2:
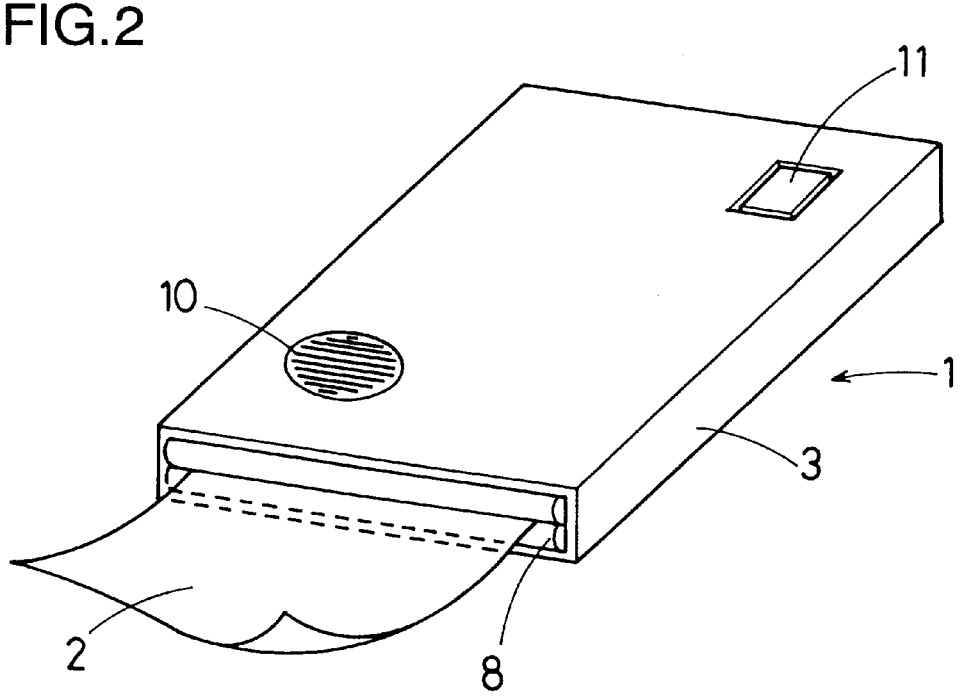
FIG. 2 is a perspective view showing a lower side of the image forming apparatus.

A detailed description of the first embodiment will be given referring to FIGS. 1, 2. In FIG. 1, an image forming apparatus 1 has a storage case 3 for storing a microcapsule sheet 2 as a photo-sensitive recording medium. At both sides of the rear end of the storage case 3 (upper side end in FIGS. 1, 2), it is arranged a pair of sheet sensors 4, 5 which comprise transmission type sensors including a light emitting element and a light receiving element and act as judgment means for judging a storing state of the microcapsule sheet 2 in the storage case 3. In detail, the sheet sensors 4, 5 are the sensors, as mentioned later, which are utilized for judging inside and outside of the microcapsule sheet 2, that is, a condition whether the microcapsule sheet 2 is set in a state capable of image forming, on the basis of combination of ON and OFF signals therefrom.

At both corners of the rear end of the storage case 3, it is arranged outside of the sheet sensors 4, 5 a pair of detecting buttons 6, 7 as detection means. The detecting buttons 6, 7 detect, as mentioned later, a contact condition of the image forming apparatus 1 and the other portable electronic apparatus when the display of the other apparatus is contacted to the image forming apparatus 1. The structure of the buttons 6, 7 will be described hereinafter.

At the front end (lower side end in FIGS. 1, 2) of the storage case 3, it is arranged a pair of press rollers 8, 8 as press means. The press rollers 8, 8 act as the image developing rollers when the microcapsule sheet 2 is derived outside of the storage case 3 after an image is formed on the microcapsule sheet 2. Here, one end of the microcapsule sheet 2 is exposed outside of the storage case 3 under a condition that the microcapsule sheet 2 is stored in the storage case 3.

On the upper plane of the storage case 3, it is arranged a liquid crystal (LC) shutter 9 acting as a control device. The LC shutter 9 controls light quantity emitted from the display of the other portable electronic apparatus when irradiating light on the microcapsule sheet 2 in the storage case 3 according to the image displayed on the display of the other apparatus. At that time, the display of the other apparatus is contacted to the upper plane of the LC shutter 9, thus, the upper plane of the LC shutter 9 constructs a contact plane A. The structure of the above LC shutter 9 is well-known, therefore its explanation will be omitted.

The construction of the lower side in the image forming apparatus 1 will be described with reference to FIG. 2. In FIG. 2, on the lower side of the image forming apparatus 1, a speaker 10 as information means is arranged. The speaker 10 produces, as mentioned later, warning sound to inform to a user when it is detected by the sheet sensors 4, 5 that the microcapsule sheet 2 is set in the storage case 3 under the incapable condition of image forming or it is detected by the detecting buttons 6, 7 that the display of the other apparatus is not correctly contacted to the contact plane A. Further, an image forming instruction button 11 is arranged on the lower side of the apparatus 1. When the instruction button 11 is depressed the LC shutter 9 is opened for a predetermined time, thereby light is irradiated on the microcapsule sheet 2 in the storage case 3 according to the image displayed on the display of the other portable electronic apparatus. Thus, the desirable image is formed on the microcapsule sheet 2.

Figure 3:
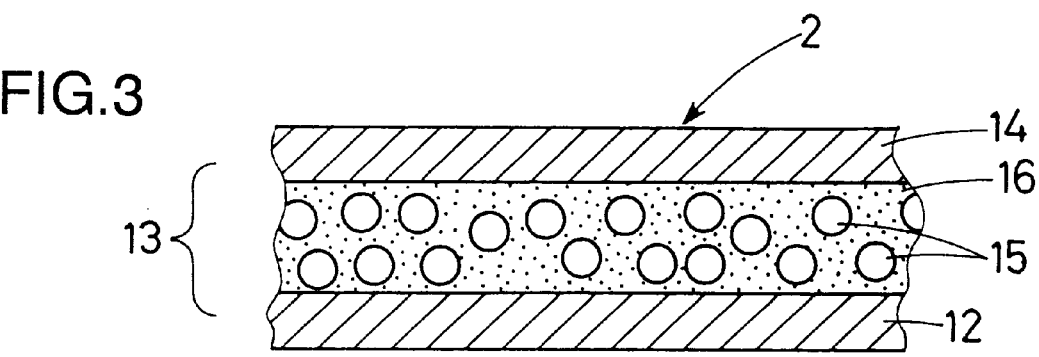
FIG. 3 is a schematically sectional view of a microcapsule sheet.

The construction of the microcapsule sheet 2 will be described with reference to FIGS. 3–5. In FIG. 3, the microcapsule sheet 2 basically has the three-layered construction comprising a transparent base sheet 12, a photosensitive image forming layer 13 formed on the base sheet 12 and a transparent laminate sheet 14 covering the image forming layer 13.

As the base sheet 12, it is desirable to use PET (polyethylene terephthalate) film or polyvinyl chloride film. The image forming layer 13 is formed as follows. First, microcapsules 15 and development material 16 are mixed, thereafter the mixture is coated on the base sheet 12, thereby the image forming layer 13 is formed. Here, in each of the microcapsule 15, it is included dye-precursor (colorant) as coloring component and photo-hardening resin which can change its mechanical strength to sensitize with the light having a predetermined wave length. The development material 16 colors by reacting with the dye-precursor.

As the dye-precursor included in the microcapsule 15, it is desirable to use dye-precursor belonging to triphenylmethane, spiropyrane. As the photo-hardening resin, it is desirable to use compound including acryloyl group such as trimethylol propane triacrylate. Further, it can use well-known material which is prepared by enclosing photopolymerization initiator such as benzophenone, benzoyl alkyl ether in resin wall such as gelatin, polyamide, polyvinyl alcohol, polyisocyanate. As the development material 16, it is desirable to use well-known developer such as inorganic oxide including acid clay, kaoline; phenol novolak resin; organic acid. Further, as the laminate sheet 14, it is desirable to use transparent resin film such as polyester film, polycarbonate film.

As the microcapsule 15, there exist three kinds of capsules. In each kind of microcapsule 15, it is included the colorless dye-precursor for one color of yellow, magenta and cyan, the photohardening resin hardening to photosensitive with the light having wave length of primary colors and the initiator.

For example, in case that blue light (its wave length is about 470 nm) is exposed on the microcapsule sheet 2, the photohardening resin in the microcapsule including the dye-precursor only corresponding to yellow is photosensitized and hardened. Thus, if such microcapsule sheet is pressed to develop, the hardened microcapsule (corresponding to yellow in this case) is not ruptured, on the other hand, the microcapsule not hardened (corresponding to magenta and cyan in this case) is ruptured. Thereby, the dye-precursor of magenta and cyan flows out of the microcapsule and reacts with the development material. As a result, the dye-precursor colors in blue by color mixture.

Further, for example, in case that green light (its wave length is about 525 nm) is exposed on the microcapsule sheet 2, the photohardening resin in the microcapsule including the dye-precursor only corresponding to magenta is photosensitized and hardened. Thus, if such microcapsule sheet is pressed to develop, the hardened microcapsule (corresponding to magenta in this case) is not ruptured, on the other hand, the microcapsule not hardened (corresponding to yellow and cyan in this case) is ruptured. Thereby, the dye-precursor of yellow and cyan flows out of the microcapsule and reacts with the development material. As a result, the dye-precursor colors in green by color mixture.

Further, for example, in case that red light (its wave length is about 650 nm) is exposed on the microcapsule sheet 2, the photohardening resin in the microcapsule including the dye-precursor only corresponding to cyan is photosensitized and hardened. Thus, if such microcapsule sheet is pressed to develop, the hardened microcapsule (corresponding to cyan in this case) is not ruptured, on the other hand, the microcapsule not hardened (corresponding to yellow and magenta in this case) is ruptured. Thereby, the dye-precursor of yellow and magenta flows out of the microcapsule and reacts with the development material. As a result, the dye-precursor colors in red by color mixture.

If all microcapsules are photosensitized and hardened by exposure, the microcapsules are not ruptured by pressure development, thus coloring does not occur. In this case, it can observe the color of the base sheet 12 (for example, white color) through the laminate sheet 14. Here, it is not necessary to color the base sheet 12. The base sheet 12 may be transparent. As mentioned above, the color image is formed on only an area where coloring reaction occurs. This coloring theory is called "self-coloring".

It will be described with reference to FIGS. 4, 5 a construction to judge how the microcapsule sheet 2 is set in the storage case 3, that is, whether the microcapsule sheet 2 is set in a correct condition capable of image forming or in a incorrect condition incapable of image forming.

Figure 4:
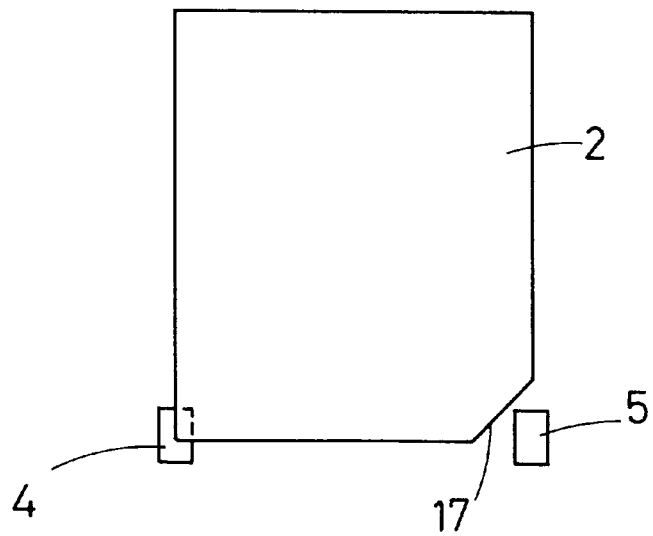
FIG. 4 is a plan view schematically showing a relationship between the microcapsule sheet set in a state that an image can be formed and sheet sensors.
Figure 5:
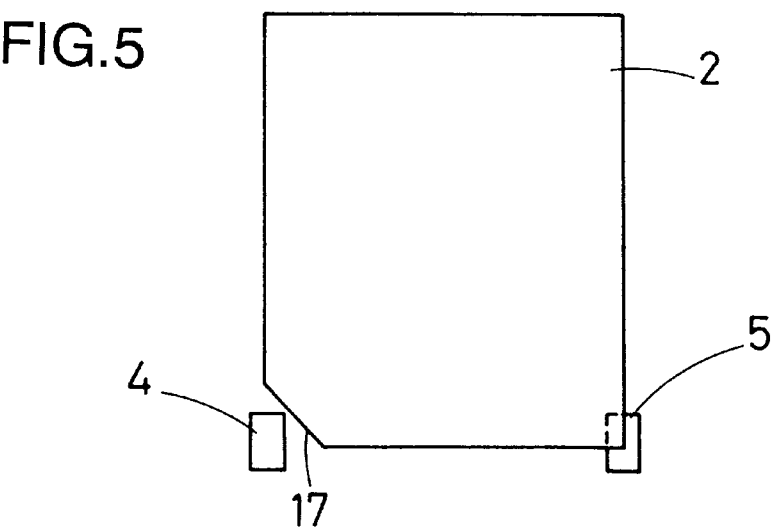
FIG. 5 is a plan view schematically showing a relationship between the microcapsule sheet set in a state the image cannot be formed and the sheet sensors.

In FIGS. 4, 5, a cutout portion 17 is formed at one corner of the microcapsule sheet 2 having a square form. Storage condition of the microcapsule sheet 2 in the storage case 3 is judged on the basis of combination of ON and OFF signals output from the sheet sensors 4, 5. Each of the sheet sensors 4, 5 outputs ON signal when the microcapsule sheet 2 exists. On the other hand, each of the sheet sensors 4, 5 outputs OFF signal when the microcapsule sheet 2 does not exist. Therefore, for instance, if the microcapsule sheet 2 is stored in the storage case 3 under the condition shown in FIG. 4, the sheet sensor 4 outputs ON signal based on existence of the microcapsule sheet 2, on the contrary, the sheet sensor 5 outputs OFF signal since the microcapsule sheet 2 does not exist. In this way, if the sheet sensor 4 outputs ON signal and the sheet sensor 5 outputs OFF signal, it means that the microcapsule sheet 2 is stored in the case 3 under the condition capable of image forming. In this case, light from the image displayed on the display of the other portable electronic apparatus is irradiated on the image forming layer 13 from the side of the transparent laminate sheet 14, through the LC shutter 9. Thereby, the desirable image is formed on the image forming layer 13. At that time, the image formed on the image forming layer 13 can be seen from the side of the laminate sheet 14.

On the other hand, if the microcapsule sheet 12 is stored in the case 3 under the condition shown in FIG. 5, the sheet sensor 4 outputs OFF signal since the microcapsule sheet 2 does not exist based on the cutout portion 17, on the contrary, the sheet sensor 5 outputs ON signal on the basis of existence of the microcapsule sheet 2. In this way, if the sheet sensor 4 outputs OFF signal and the sheet sensor 5 outputs ON signal, it means that the microcapsule sheet 2 is stored in the case 3 under the condition incapable of image forming. In this case, warning sound is produced by the speaker 10 as mentioned hereinafter.

Here, the detecting light emitted from the sensors 4, 5 is set to have a wave length so as not to photosensitize all microcapsules on the microcapsule sheet 2. If both sheet sensors 4, 5 output OFF signals, it concludes that the microcapsule sheet 2 is not stored in the case 3.

Construction of the detecting buttons 6, 7 will be described with reference to FIG. 6. Since both of the buttons 6, 7 have the same construction, the following description will be done concerning with the detecting button 7. The detecting buttons 6, 7 are arranged periphery of the LC shutter 9 and it is desirable that several buttons are arranged. More preferably, the detecting buttons are arranged at more than three corners of the LC shutter 9.

Figure 6:
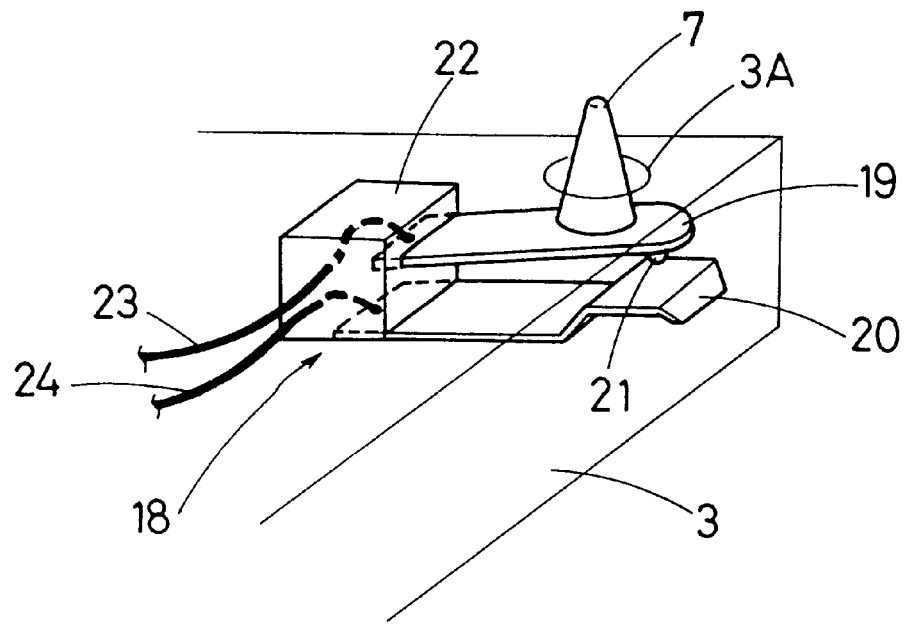
FIG. 6 is a schematic view showing a circumstance structure around a detecting button.

In FIG. 6, the detecting button 7 is formed on one (lead member 19) of two resilient lead members 19, 20 in a lead switch 18 and top portion of the button 7 is projected from the upper surface of the storage case 3 through a hole 3A. On the lower surface of the lead member 19, it is formed a contact point 21 which contacts to the lead member 20 when the button 7 is pressed on the basis that the display of the other electronic apparatus is contacted to the contact plane A. The lead switch 18 is well-known and has a resin block 22 for fixing the lead members 19, 20 and lead lines 23, 24 connected to the lead members 19, 20, respectively. One of lead lines 23, 24 is connected to a power source (not shown).

In the above construction including the detecting button 7, when the display of the other apparatus is contacted on the contact plane A, the detecting button 7 is pressed in the lower direction and the contact point 21 contacts to the lead member 20. Thereby, electric current flows between the lead lines 23, 24 from the power source. This electric current is detected by the control part (mentioned hereinafter) and it is detected that the display of the other apparatus is contacted to the contact plane A.

Figure 7:
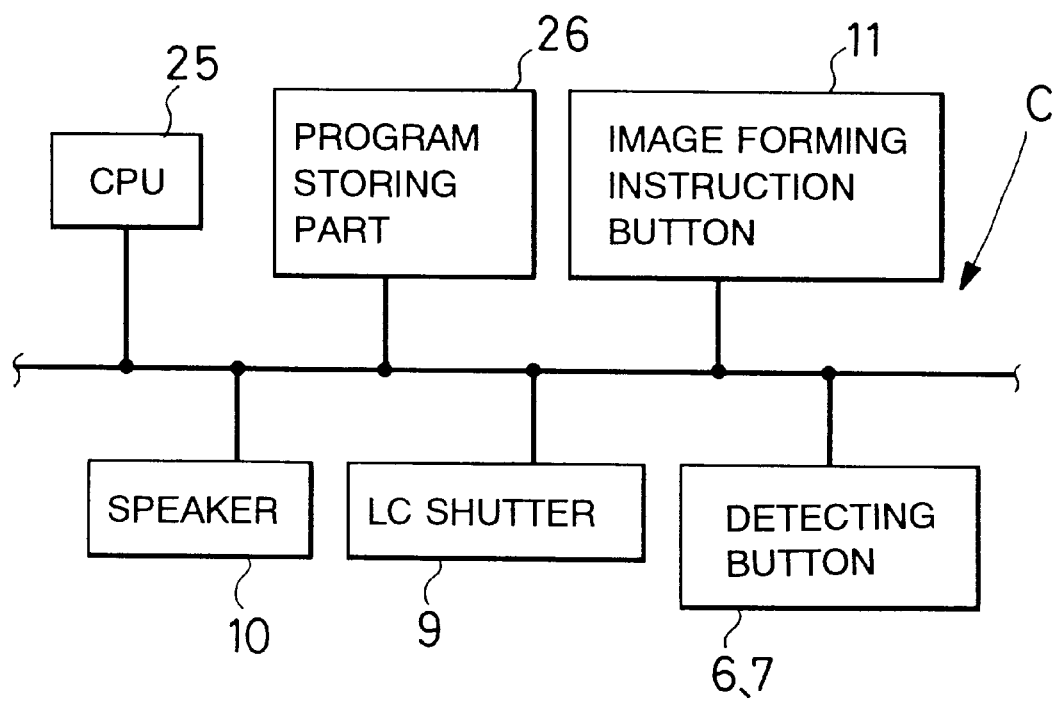
FIG. 7 is a block diagram showing control system of the image forming apparatus.

Control system of the image forming apparatus 1 will be described with reference to FIG. 7. In FIG. 7, control part C is basically constructed from CPU 25 which has RAM and ROM. To the CPU 25, program storing part 26, the image forming instruction button 11, the speaker 10, the LC shutter 19 and the detecting buttons 6, 7 are connected.

Figure 8:
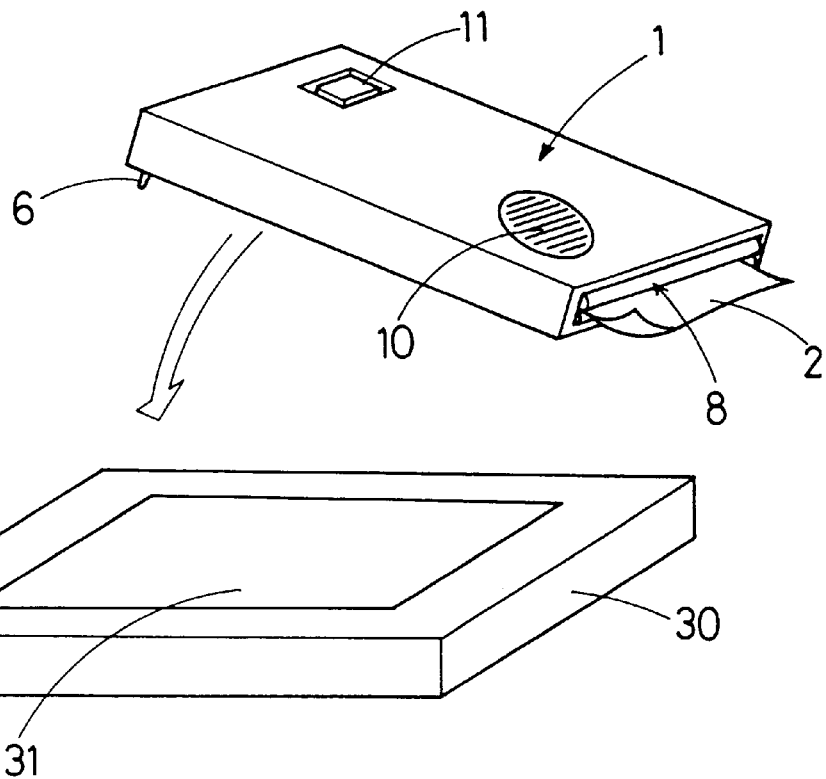
FIG. 8 is a schematic view showing a condition that a contact plane of the image forming apparatus is contacted to the other portable electronic apparatus.
Figure 9:
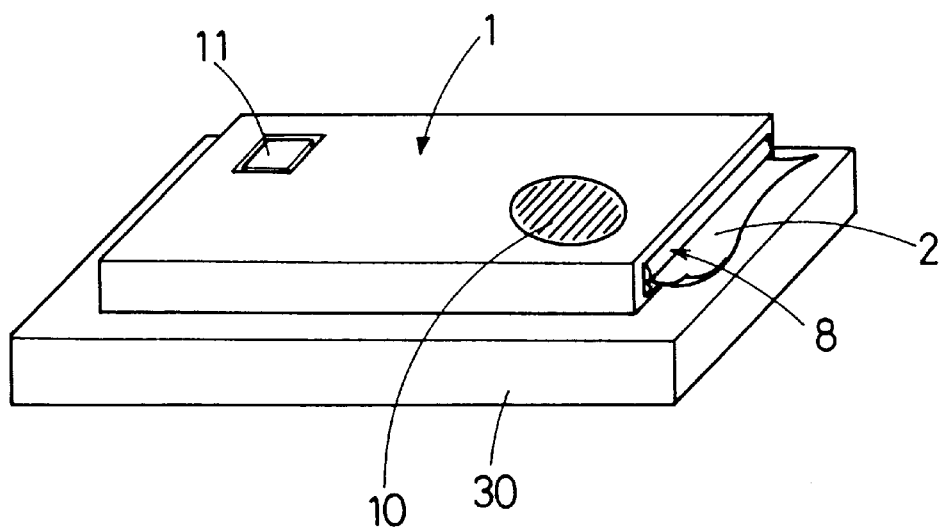
FIG. 9 is a schematic view showing a condition after the contact plane of the image forming apparatus is contacted to the other electronic apparatus.

Image forming process conducted in the above constructed image forming apparatus 1 will be described with reference to FIGS. 8–10. When the image displayed on the display of the other electronic apparatus is printed on the microcapsule sheet 2 in the image forming apparatus 1, the contact plane A is faced to the underside as shown in FIG. 8, and is contacted to the display 31 of the other apparatus 30 while opposing to the display 31. Here, the display 31 of the other electronic apparatus 30 such as electronic notebook is opened and the desirable image to be printed is displayed on the display 31. FIG. 9 shows the state that the contact plane A of the image forming apparatus 1 is contacted to the display 31 of the other apparatus 30.

Figure 10A:
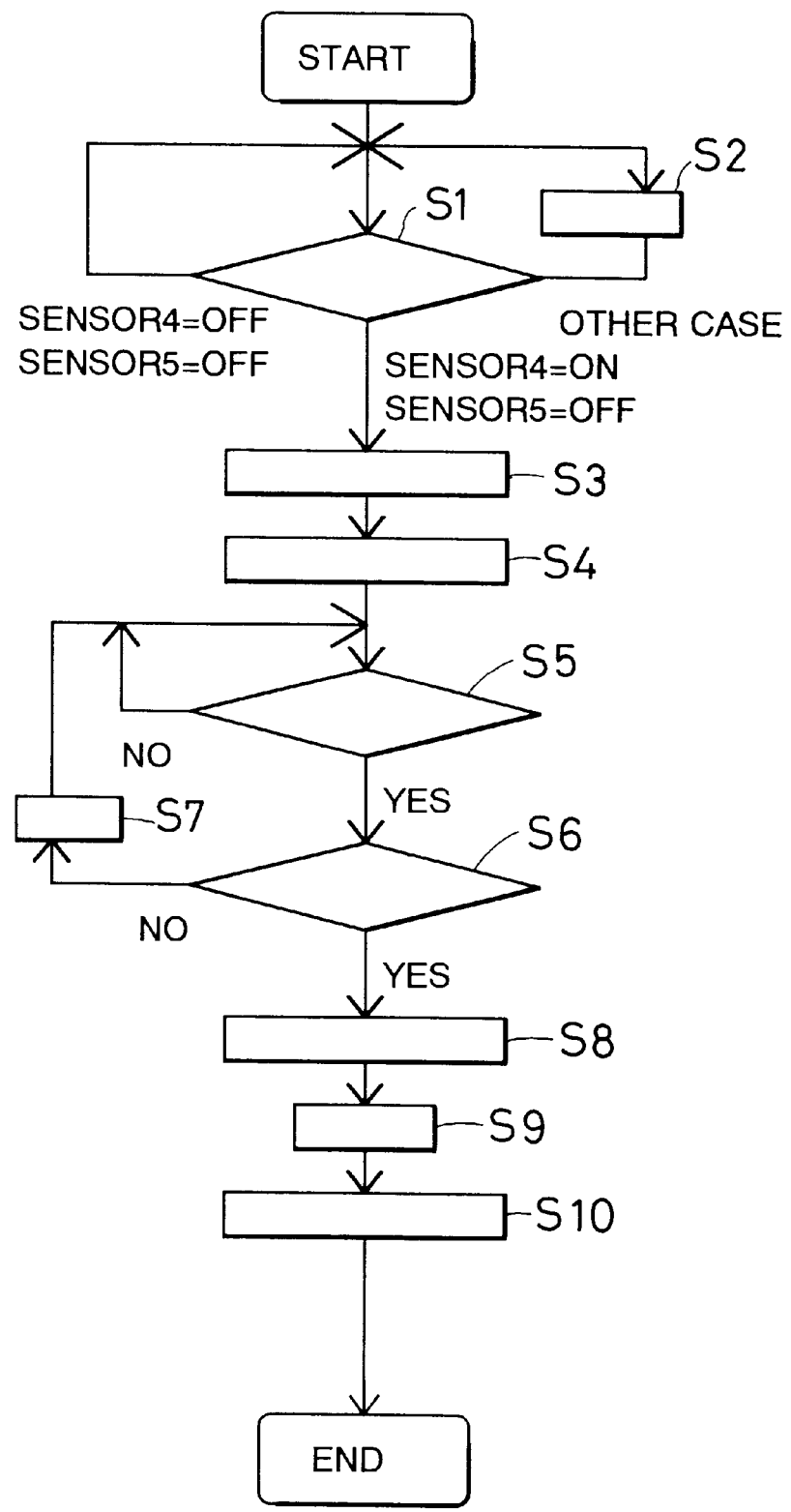
FIGS. 10(A), (B) show a flowchart of main program to process the image forming apparatus.

After the above operation, main process of the image forming apparatus 1 starts. In FIGS. 10(A), (B), it is judged in step (abbreviated as "S" hereinafter) 1 ON/OFF condition of the sheet sensors 4, 5. The sheet sensors 4, 5 are used for judging whether the microcapsule sheet 2 is stored in the storage case 3 under the condition capable of image forming, and if the sheet sensor 4 outputs ON signal and the sheet sensor 5 outputs OFF signal, it is judged that the microcapsule sheet 2 is stored under the condition capable of image forming, thereafter procedure shifts to S3.

If judged that both sheet sensors 4, 5 are in OFF state, it indicates that the microcapsule sheet 2 is not stored in the case 3, therefore procedure waits until the microcapsule sheet 2 is set in the case 3. In a case except for the above two cases (one; the sheet sensor 4 is ON and the sheet sensor 5 is OFF, the other; both the sheet sensors 4, 5 are OFF), it indicates that the microcapsule sheet 2 is stored in the case 3 in an upset state in the upper and lower direction, thus warning sound is produced by the speaker 10, thereafter procedure returns to Si. Based on the warning sound, the user can notice that the microcapsule sheet 2 is not normally stored in the case 3.

In S3, the desirable image to be printed is displayed on the display 31 of the other apparatus 30, and in S4, the contact plane A of the LC shutter 9 is contacted to the display 31, as explained in FIGS. 8, 9. In S5, it is judged whether the image forming instruction button 11 is pressed or not. If the instruction button 11 is pressed (S5:YES), procedure shifts to S6. On the other hand, if the instruction button 11 is not pressed (S5:NO), procedure waits until the instruction button 11 is pressed. In S6, it is judged whether all of the detecting buttons 6, 7 become ON. If all of the detecting buttons 6, 7 are ON (S6:YES), it indicates that the contact plane A of the image forming apparatus 1 correctly contacts to the display 31 of the other apparatus 30, thus procedure shifts to S8. On the contrary, if all of the detecting buttons 6, 7 are not ON (S6:NO), it indicates that the contact plane A does not correctly contact to the display 31. In this case, warning sound is produced from the speaker 10 and procedure returns to S5. The user can notice that the contact plane A does not enough contact to the display 31 and can adjust both the apparatuses 1, 30 so that the contact plane A is correctly contacted to the display 31.

Based on that it is judged through the above process that the microcapsule sheet 2 is stored in the case 3 under the condition capable of image forming and the contact plane A is correctly contact to the display 31, the LC shutter 9 is opened for a predetermined time and thereafter closed in S8. Thereby, light is irradiated on the image forming layer 13 of the microcapsule sheet 2 according to the image displayed on the display 31, and the desirable image is exposed and formed on the image forming layer 13. After the LC shutter 9 is opened and closed in S8, termination sound is produced though the speaker 10 in S9. Thereby, the user can notice that image formation on the microcapsule sheet 2 is terminated.

Thereafter, the user holds the exposed end of the microcapsule sheet 2 and derives it from the storage case 3 of the image forming apparatus 1. At that time, the microcapsule sheet 2 is derived while being pressed between the press rollers 8, 8. On the basis of this derivation, the microcapsules 15 are selectively ruptured according to the image formed on the microcapsule sheet 2, and the component in the microcapsules 15 is reacts with the development material 16. As a result, the desirable color image is formed. Thereafter, main process is terminated.

As mentioned above, in the image forming apparatus 1 of the first embodiment, when the image displayed on the display 31 of the other electronic apparatus 30 is formed on the microcapsule sheet 2, the LC shutter 9 is opened for a predetermined time while contacting the display 31 to the contact plane A of the image forming apparatus 1 and light is irradiated on the microcapsule sheet 2 from the display 31. Thereby, the desirable image is formed on the image forming layer 13 of the microcapsule sheet 2 according to the image displayed on the display 31. In this way, the image corresponding to the image displayed on the display 31 can be easily formed on the microcapsule sheet 2 by simple operation to contact the display 31 of the other apparatus 30 to the contact plane A of the image forming apparatus 1. Further, since it is not necessary to install a special construction for irradiating the image on the microcapsule sheet 2, the apparatus 1 can be miniaturized with low cost.

Thus, it can realize the image forming apparatus 1 with high portability through which the image displayed on the display 31 of the other electronic apparatus 30 can be easily printed regardless of time and place. Further, light quantity irradiated from the display 31 on the microcapsule sheet 2 is controlled by the LC shutter 9, thereby light corresponding only to the desirable image displayed on the display 31 can be selectively irradiated on the microcapsule sheet 2, thus the image with high quality can be obtained while improving operation efficiency of image printing.

In the image forming apparatus 1, two detecting buttons 6, 7 are arranged and the open and close control of the LC shutter 9 is conducted only in the case when it is judged that the contact plane A is correctly contacted to the display 31 based on ON signals from both the buttons 6, 7. Thus, for example, if it is detected that the contact plane A does not correctly contact to the display 31 through the buttons 6, 7, the LC shutter 9 is never opened. Therefore, it can avoid misoperation of the user of the apparatus 1 and it can prevent unnecessary image from being erroneously printed on the microcapsule sheet 2. As a result, it can avoid that the microcapsule sheet 2 is wastefully consumed by reducing misprint and improving operational efficiency.

Further, if detected that the display 31 does not correctly contact to the contact plane A based on OFF signals of both detecting buttons 6, 7, warning sound is produced through the speaker 10. Thereby, misprint can be reduced by preventing misoperation of the user of the image forming apparatus 1.

Since termination sound is produced through the speaker 10 to inform the user of image forming termination when light is irradiated for a predetermined time on the microcapsule sheet 2 from the display 31, misprint can be reduced by preventing misoperation of the user.

In the image forming apparatus 1, a pair of press rollers 8, 8 are arranged at the one end of the storage case 3 and the microcapsules 15 are selectively ruptured by the press rollers 8, 8 according to the image on the image forming layer 13, when the microcapsule sheet 2 is derived out of the case 3 after the image is formed on the image forming layer 13, and the dye-precursor flowing out and the development material mutually react, thereby the image is developed. Therefore, it is not necessary special development liquid or a heater. Thus, it can realize the image forming apparatus with high portability and the size thereof can be miniaturized with low cost since there is no necessity to consider heat radiation because heater is not installed.

Further, in the image forming apparatus 1, a pair of sheet sensors 4, 5 are arranged at the one end of the case 3 and it is judged by the sheet sensors 4, 5 whether the microcapsule sheet 2 is stored in the case 3 under the condition capable of image forming. And if judged by the sheet sensors 4, 5 that the microcapsule sheet 2 is stored under the condition incapable of image forming, warning sound is produced through the speaker 10. Thereby, it can avoid misoperation of the user of the apparatus 1 and it can prevent unnecessary image from being erroneously printed on the microcapsule sheet 2. As a result, it can avoid that the microcapsule sheet 2 is wastefully consumed by reducing misprint and improving operational efficiency.

Further, in the microcapsule sheet 2, microcapsules 15 in each of which the photohardening material and the dye-precursor are enclosed and the image forming layer 13 formed of the development material are sandwiched between the base sheet 12 and the transparent laminate sheet 14. Thereby, the microcapsule sheet 2 can be easily handled after the image is formed on the image forming layer 13. Since the image forming layer 13 is protected by the base sheet 12 and the transparent laminate sheet 14, it can prevent the image forming layer 13 from being peeled off and formed deficit therein, and endurance of the image forming layer 13 can be improved.

Figure 11:
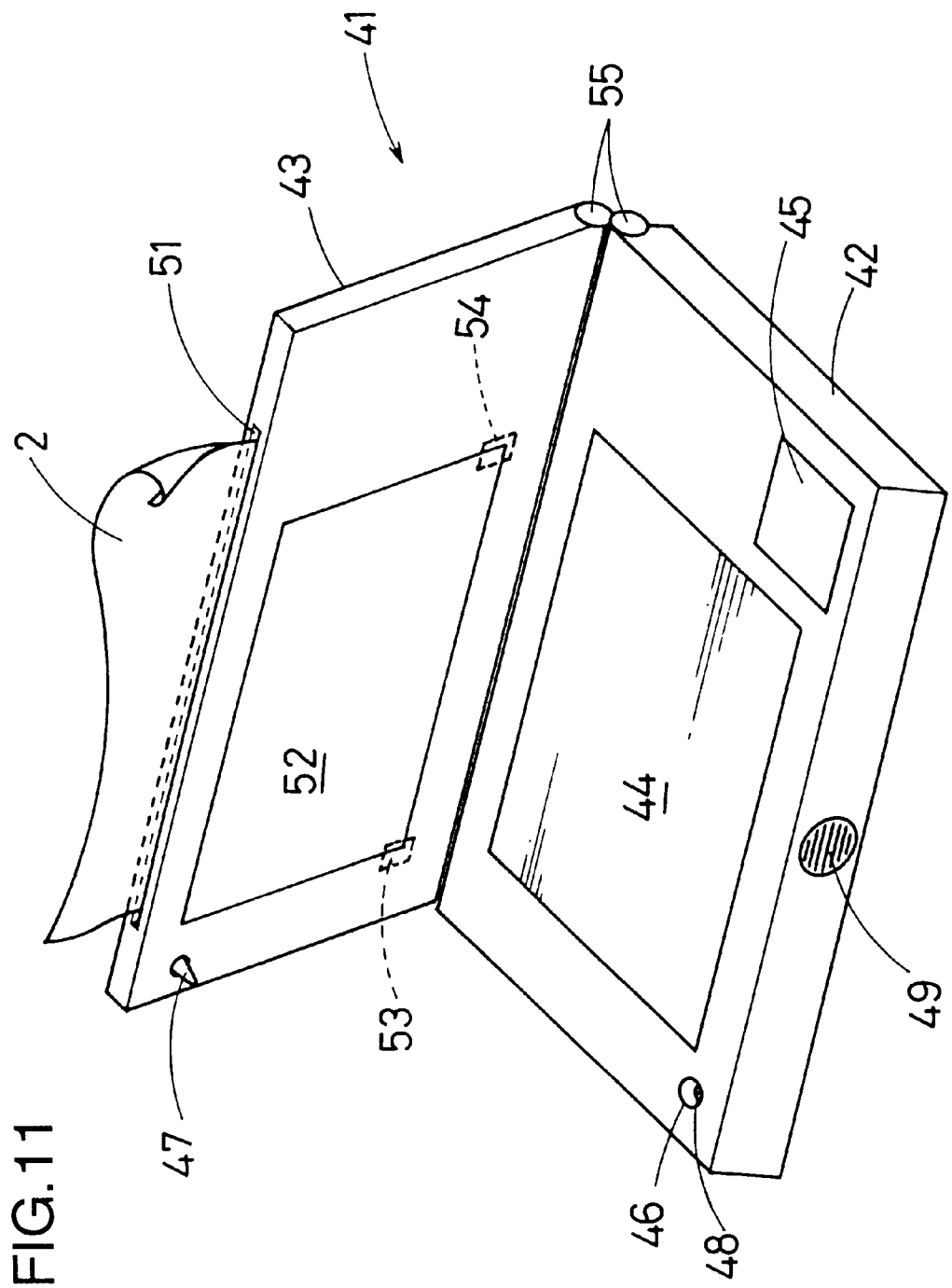
FIG. 11 is a perspective view showing a state that a lid member is opened against a main body of the image forming apparatus according to the second embodiment.
Figure 12:
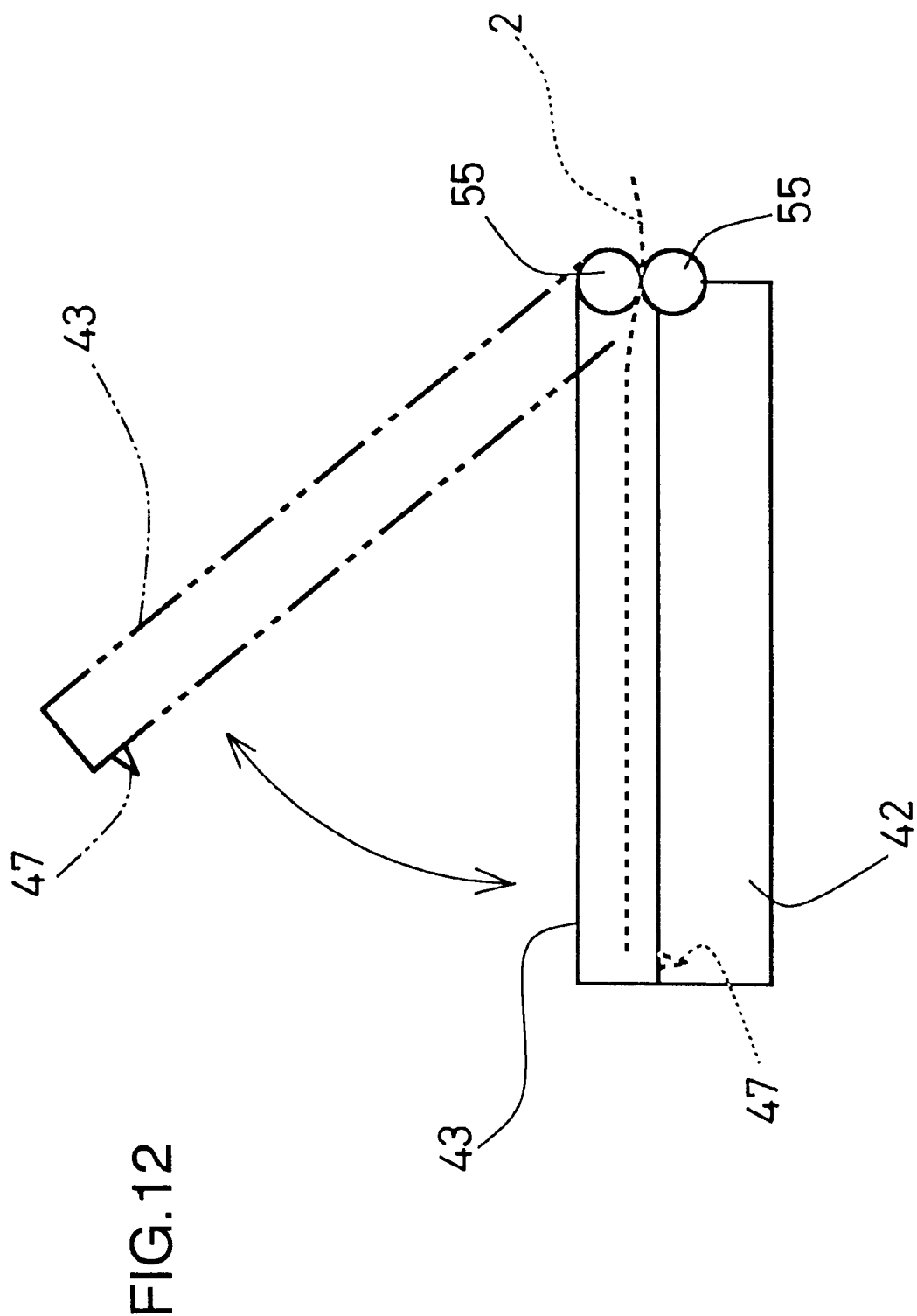
FIG. 12 is side view of the image forming apparatus showing a state that the lid member is contacted to the main body.

Hereinafter, a detailed description of the second embodiment will be given with reference to FIGS. 11, 12. In FIG. 11, an image forming apparatus 41 is basically constructed from a main body 42 and a lid member 43 which is rotatably supported to one side of the main body 42. on the upper surface of the main body 42, a liquid crystal (LC) display 44 is arranged. The LC display 44 acts as image displaying means to display various image data thereon. As the image data displayed on the LC display 44, it is conceivable the image data which is taken in the image forming apparatus 41 from the other compatible apparatus or the personal computer, or which is input through a handwriting input device (not shown) installed in the image forming apparatus 41.

At the position near the LC display 44 on the upper surface of the main body 42 (at the right under position in FIG. 11), an image forming instruction button 45 is arranged. This instruction button 45 is used for instructing image formation on the image forming layer 13 of the microcapsule sheet 2, corresponding to the desirable image displayed on the LC display 44. That is, when the image forming instruction button 45 is depressed, a liquid crystal (LC) shutter 52 is opened for a predetermined time, thereby light is irradiated on the microcapsule sheet 2 stored in a storage part 51 according to the image displayed on the LC display 44. Thus, the desirable image is formed on the microcapsule sheet 2.

In the image forming apparatus 41, it is utilized the microcapsule sheet 2 which is as same as that used in the first embodiment.

At a left corner of the main body 42, a sensor hole 46 is formed in which it is arranged a sensor 48 such as microswitch. The sensor 48 is switched ON/OFF by a sensor projection 47 (mentioned hereinafter) which is positioned on the lid member 43 so as to correspond to the sensor hole 46. The sensor 48 is used for detecting whether the lid member 43 is in a closed state against the main body 42 or in a opened state against the main body 42, thereby the sensor 48 detects whether the microcapsule sheet 2 stored in the lid member 43 is contacted to the LC display 44 through the LC shutter 52. Further, at the front end of the main body 42, it is arranged a speaker 49 as information means. The speaker 49 produces warning sound when image formation on the microcapsule sheet 2 is completed. The user of the image forming apparatus 41 can notice by the warning sound that image formation on the microcapsule sheet 2 is completed.

In the lid member 43, it is formed a storage part 51 as storage means for storing the microcapsule sheet 2 as a photo-sensitive recording medium. One end of the microcapsule sheet 2 is derived, as shown in FIG. 12, out of the storage part 51, under a condition that the microcapsule sheet 2 is stored in the storage part 51. On the lower surface of the lid member 43, the LC shutter 52 as a control device is arranged corresponding to the LC display 44 of the main body 42. The LC shutter 52 controls light quantity when light is irradiated on the microcapsule sheet 2 in the storage part 51 according to the image displayed on the LC display 44. At that time, underside of the LC shutter 52 is contacted to the upper surface of the LC display 44 when the lid member 43 is rotated in a close direction and closed as shown in FIG. 12. In this way, the LC shutter 52 exists between the microcapsule sheet 2 in the storage part 51 and LC display 44, and the microcapsule sheet 2 is contacted to the LC display 44 while lying the LC shutter 52 therebetween.

The structure of the LC shutter 52 is well-known, therefore its explanation will be omitted.

In the storage part 51, it is arranged a pair of sheet sensors 53, 54 for detecting inside and outside of the microcapsule sheet 2. The sheet sensors 53, 54 are positioned at both sides of the lower end in the storage part 51 as shown in FIG. 11, the lower end corresponding to an insert direction of the microcapsule sheet 2. The sheet sensors 53, 54 are used, as mentioned later, for judging inside and outside of the microcapsule sheet 2, that is, a condition whether the microcapsule sheet 2 is set in the state (normal state) capable of image forming, on the basis of combination of ON and OFF signals therefrom. To the upper left position of the LC shutter 52, the sensor projection 47 is formed so as to correspond to the sensor hole 46 of the main body 42. The sensor projection 47 switches ON the sensor 48 positioned in the sensor hole 46 when the lid member 43 is closed, and it is judged whether the microcapsule sheet 2 in the storage part 51 is contacted to the LC display 44 through the LC shutter 52, based on ON signal from the sensor 48. The sensor 48 retains OFF state when the lid member 43 is opened against the main body 42, as shown in FIG. 12 by alternate long and two short dashes line. As mentioned hereinafter, it is formed in the sensor projection 47 an engaging groove which constructs a part of lock mechanism for the main body 42 and the lid member 43.

In the image forming apparatus 41, a pair of press rollers 55, 55 are arranged at one side (the right side in FIGS. 11, 12) where the lid member 43 is supported so as to open and close against the main body 42. The press rollers 55, 55 act as developing rollers to develop the image formed on the microcapsule sheet 2 when the image is formed on the microcapsule sheet 2 and thereafter the microcapsule sheet 2 is derived out of the storage part 51.

Figure 13:
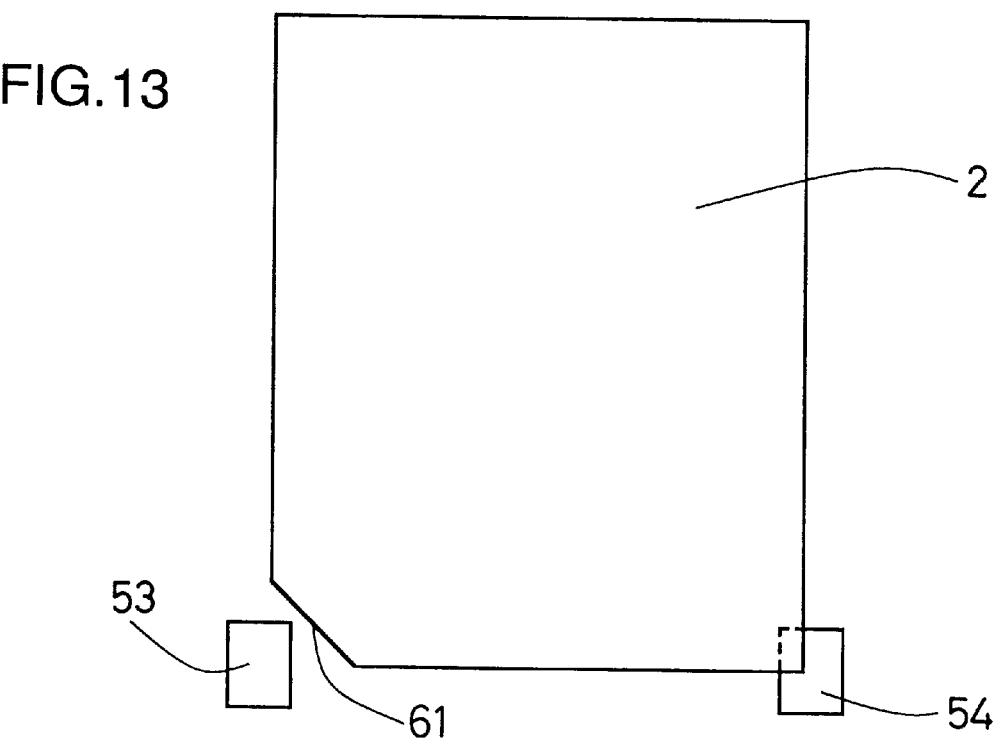
FIG. 13 is a plan view schematically showing a relationship between the microcapsule sheet set in a normal state that the image can be formed and the sheet sensors.
Figure 14:
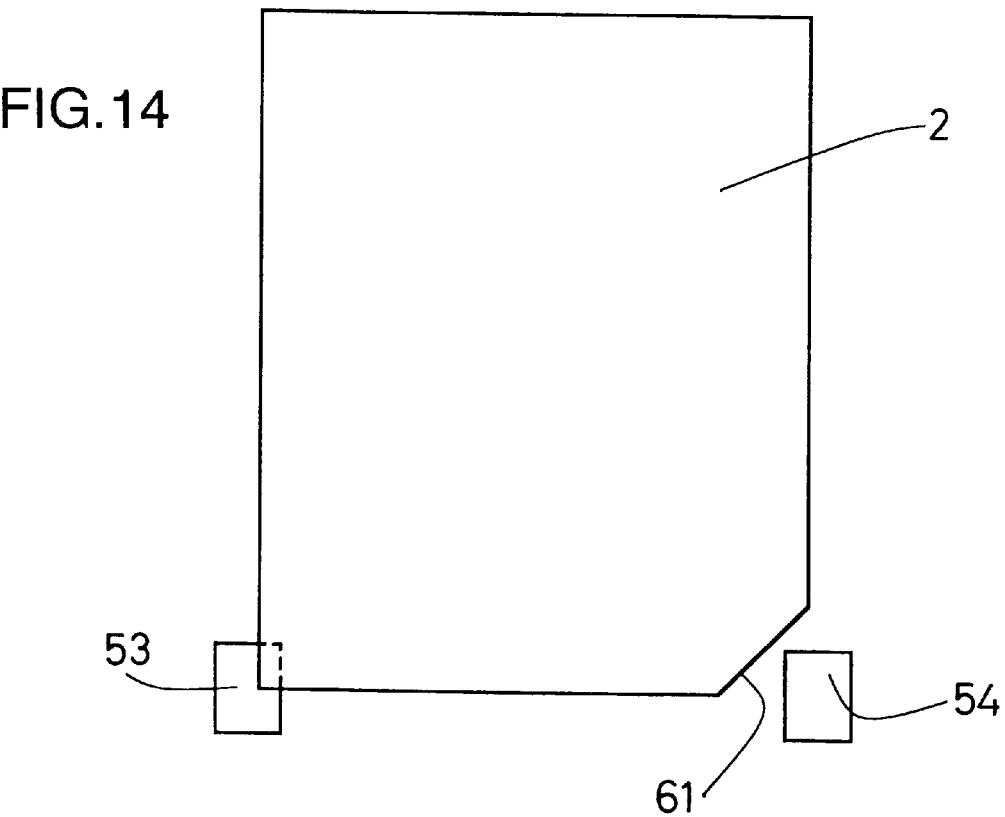
FIG. 14 is a plan view schematically showing a relationship between the microcapsule sheet set in an upset state in the right and left direction that the image cannot be formed and the sheet sensors.

With reference to FIGS. 13, 14, it will be described hereinafter construction for judging how the microcapsule sheet 2 is stored in the storage part 51, that is, whether the microcapsule sheet 2 is stored under the condition (normal condition) capable of image forming. Here, as storing condition of the microcapsule sheet 2 in the storage part 51, it will exist three conditions; the condition that the microcapsule sheet 2 is normally stored without inside and outside reversion and top and bottom reversion, the condition that the microcapsule sheet 2 is stored with inside and outside reversion and the condition that the microcapsule sheet 2 is stored with top and bottom reversion.

In FIGS. 13, 14, a cutout portion 21 is formed at one corner of the microcapsule sheet 2 having a square form. Storage condition of the microcapsule sheet 2 in the storage part 51 is judged on the basis of combination of ON and OFF signals output from the sheet sensors 53, 54. Each of the sheet sensors 53, 54 outputs ON signal when the microcapsule sheet 2 exists. On the other hand, each of the sheet sensors 53, 54 outputs OFF signal when the microcapsule sheet 2 does not exist. Therefore, for instance, if the microcapsule sheet 2 is stored in the storage part 51 under the condition shown in FIG. 13, the sheet sensor 53 outputs OFF signal since the microcapsule sheet 2 does not exist, on the contrary, the sheet sensor 54 outputs ON signal based on existence of the microcapsule sheet 2. In this way, if the sheet sensor 53 outputs OFF signal and the sheet sensor 54 outputs ON signal, it means that the microcapsule sheet 2 is stored in the storage part 51 under the normal condition capable of image forming. In this case, light from the image displayed on the display 44 is irradiated on the image forming layer 13 from the side of the transparent base sheet 12, through the LC shutter 52. Thereby, the desirable image is formed on the image forming layer 13. At that time, the image formed on the image forming layer 13 can be seen from the side of the transparent laminate sheet 14.

On the other hand, if the microcapsule sheet 2 is stored in the storage part 51 under the condition shown in FIG. 14, the sheet sensor 53 outputs ON signal on the basis of existence of the microcapsule sheet 2, on the contrary, the sheet sensor 54 outputs OFF signal since the microcapsule sheet 2 does not exist. In this way, if the sheet sensor 53 outputs ON signal and the sheet sensor 54 outputs OFF signal, it means that the microcapsule sheet 2 is stored in the storage part 51 under the condition with inside and outside reversion. In this case, as mentioned later, it is prepared a mirror image by reversing left and right of the image displayed on the LC display 44 and the mirror image is displayed on the LC display 44. Thereafter, light from the mirror image on the LC display 44 is irradiated through the LC shutter 52 on the image forming layer 13 of the microcapsule sheet 2 from the side of the transparent laminate sheet 14. Thereby, the desirable image is formed on the image forming layer 13. The image formed on the layer 13 can be seen from side of the transparent laminate sheet 14.

If ON signals are output from the sheet sensors 53, 54, it means that the microcapsule sheet 2 is stored in the storage part 51 under the condition with top and bottom reversion. In this case, as mentioned later, it is displayed on the LC display 44 a message that the microcapsule sheet 2 is stored with top and bottom reversion in the storage part 51, thereby caution is given to the user.

If OFF signals are output from both the sheet sensors 53, 54, it means that the microcapsule sheet 2 is not stored in the storage part 51. Therefore, in this case, it is displayed on the LC display 44 a message that the microcapsule sheet 2 should be stored in the storage part 51, thereby caution is given to the user.

Figure 15:
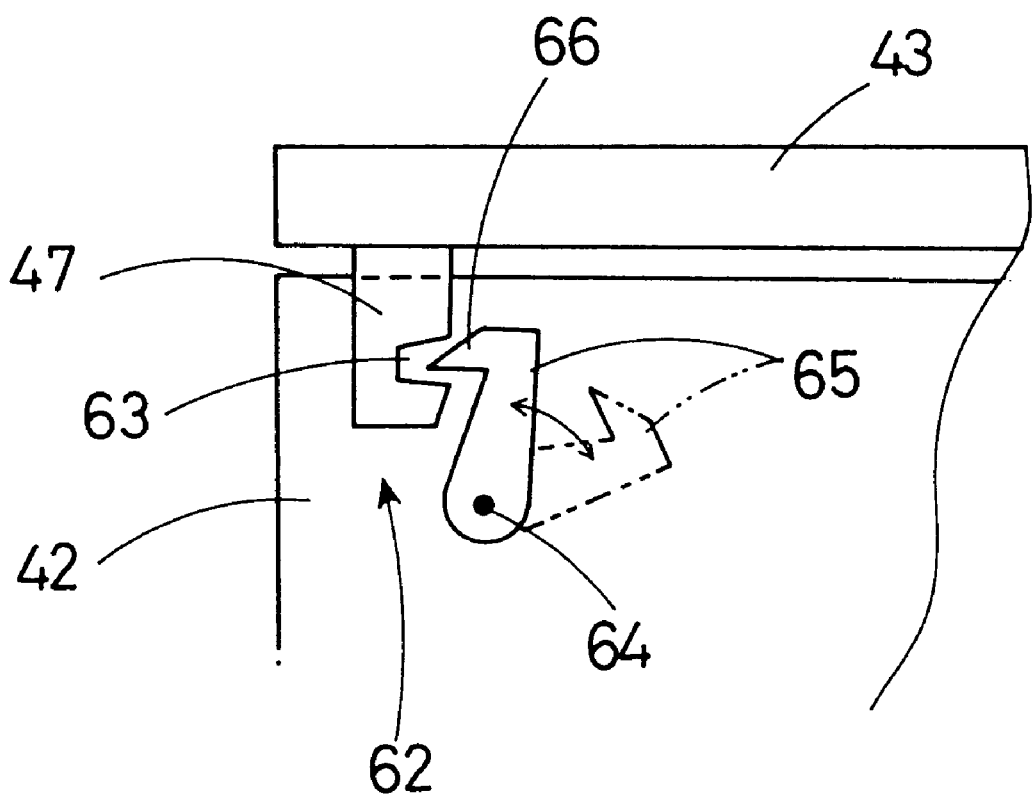
FIG. 15 is a schematic view showing a lock mechanism.

Hereinafter, it will be described the lock mechanism for locking the main body 42 and the lid member 43 by closing the lid member 43 while mutually contacting the LC display 44 on the main body 42 and the LC shutter 52 of the lid member 43. In a lock mechanism 22 shown in FIG. 15, the engaging groove 63 is formed in the sensor projection 47. In the main body 42, a stopper member 65 is rotatably arranged around a support shaft 64 near the sensor 48 (not shown in FIG. 15). The stopper member 65 is rotated by a drive motor (not shown). At the top of the stopper member 65, an engaging part 66 engagable with the engaging groove 63 is formed. This engaging part 66 is engaged with the groove 63 when rotated in the counter clockwise direction in FIG. 15, thereby the lid member 43 is fixed to the main body 42 under the condition that the LC display 44 and the LC shutter 52 are mutually contacted. When the engaging part 66 is rotated in the clockwise direction in FIG. 15, engagement between the engaging part 66 and the engaging groove 63 is released, as shown by alternate long and two short dashes line.

Control system of the image forming apparatus 41 will be described with reference to FIG. 16. In FIG. 16, control part C is basically constructed from CPU 70 which has RAM and ROM. To the CPU 70, program storing part 71 for storing main process program and the other various programs, image memory 72 for storing various image data, the image forming instruction button 45 and the sensor 48 are connected. Similarly, the speaker 49, the LC display 44, the LC shutter 52 and the sheet sensors 53, 54 are connected to the CPU 70.

Figure 17A:
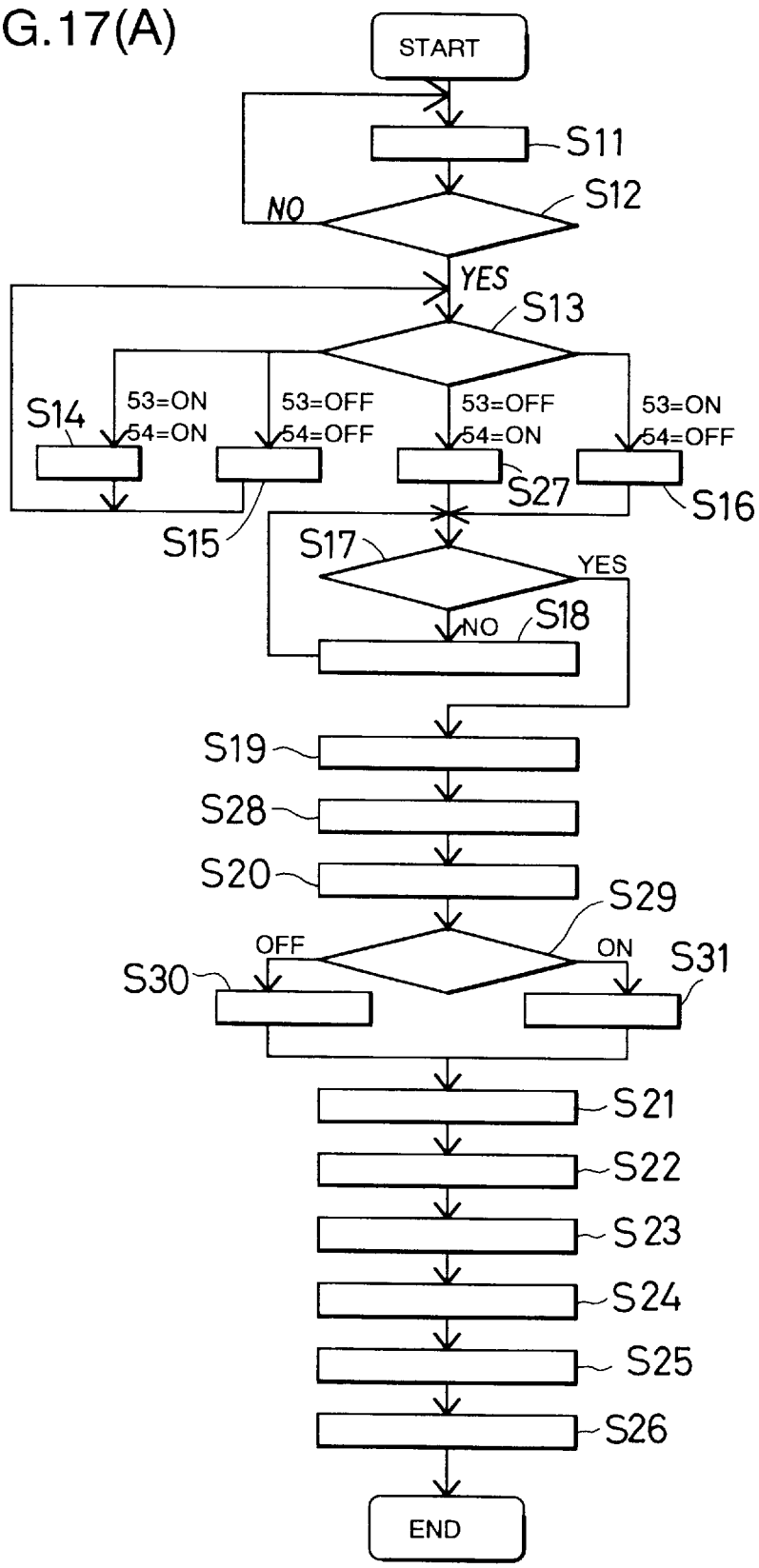

Image forming process conducted in the above constructed image forming apparatus 41 will be described with reference to FIGS. 17(A), (B). In FIGS. 17(A), (B), after the main process starts, the image data is sent and stored in the image memory 72 in S11, according to display control program stored in the program storing part 71, and the image is displayed on the LC display 44 based on the image data. In this state, the user of the apparatus 41 is preparing the image data while recognizing the image displayed on the LC display 44. At that time, the user can prepare the desirable image data by revising or changing the data through a pen input device (not shown).

In S12, it is judged whether the image forming button 45 is depressed or not. If the button 45 is depressed (S12: YES), procedure shifts to S13. On the other hand, if the button 45 is not depressed (S12:NO), procedure returns to S11.

In S13, it is judged ON/OFF state of the sheet sensors 53, 54. If the output signal from the sheet sensor 53 is OFF and the output signal from the sheet sensor 54 is ON, it indicates that the microcapsule sheet 2 is stored in the storage part 51 under the normal condition capable of image forming, thus procedure shifts to S27. In S27, mirror mode is set to OFF and procedure shifts to S17. On the other hand, if both the output signals from the sheet sensors 53, 54 are ON, it indicates that the microcapsule sheet 2 is stored under the condition with top and bottom reversion, and the message "Microcapsule sheet is stored with top and bottom reversion. Please reset microcapsule sheet." is displayed on the LC display 44. Thereafter procedure returns to S13. The user can reset the microcapsule sheet 2 in the storage part 51 according to the message.

If both the output signals from the sheet sensors 53, 54 are OFF, it indicates that the microcapsule sheet 2 is not stored in the storage part 51, and the message "Please set microcapsule sheet." is displayed on the LC display 44 in S15. Thereafter, procedure returns to S13. The user can set the microcapsule sheet 2 in the storage part 51 according to the message. Further, if the output signal from the sheet sensor 53 is ON and the output signal from the sheet sensor 54 is OFF, it indicates that the microcapsule sheet 2 is stored under the condition with inside and outside reversion, and in S16, the image data stored in the image memory 72 is reversed its left and right and the mirror image data is prepared and stored, further the mirror mode is set to ON. Thereafter, procedure shifts to S17.

In S17, it is judged whether the sensor 48 is ON or OFF. If the sensor 48 is ON (S17:YES), procedure shifts to S19, on the other hand, if the sensor 48 is OFF (S17:NO), the message "Please close lid member." is displayed on the LC display 44 in S18, thereafter procedure returns to S17. The user closes the lid member 43 according to the message.

In S19, the image data displayed on the LC display 44 is deleted, thereby the display 44 is switched in the dark state. At this time, the CPU 70 recognizes the start of exposure (exposing mode). In S28, the stopper member 65 rotates in the counter clockwise direction and the engaging part 66 engages with the engaging groove 63 of the sensor projection 47. Based on the engagement between the engaging part 66 and the engaging groove 63, the lid member 43 is restricted to open and close and locked to the main body 42 in closing state. In S20, the LC shutter 52 is opened, thereby the shutter 52 is set in the state that light can pass therethrough.

In S29, it is judged the mirror mode set in S27 or S16. If judged that the mirror mode is set to OFF (S29:OFF), the image data prepared in S11 and stored in the image memory 72 is read out in S30. On the other hand, if judged that the mirror mode is set to ON (S29:ON), the image data prepared in S16 and stored in the image memory 72 is read out in S31. In S21, the image data read out in S30 or S31 is displayed on the LC display 44 for a predetermined time.

At that time, since the LC shutter 52 is opened, light corresponding to the image displayed on the LC display 44 is irradiated on the microcapsule sheet 2, thereby the image forming layer 13 is exposed according to the image on the display 44 and the image is formed on the image forming layer 13.

Figure 18A:
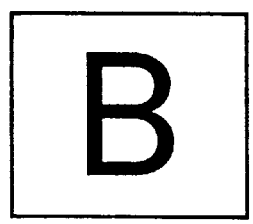
FIG. 18 is a view to explain a normal image and a mirror image, both being displayed on a liquid crystal display.

The image displayed on the LC display 44 will be described with reference to FIG. 18. If the microcapsule sheet 2 is stored in the storage part 51 under the normal condition based on that the sheet sensor 53 is OFF and the sheet sensor 54 is ON, the image shown in FIG. 18(A) is displayed on the LC display 44. This reason is as follows. The microcapsule sheet 2 is generally stored in the storage part 51 so that the base sheet 12 becomes underside. Thus, light irradiated from the side of the LC display 44 (light irradiated on the basis of the displayed image) is entered from the side of the transparent base sheet 12, and the image formed on the microcapsule sheet 2 is seen from the side of the transparent laminate sheet 14.

Figure 18B:
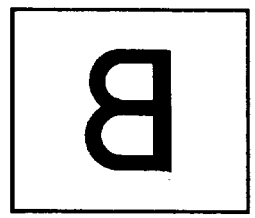
Figure 22:
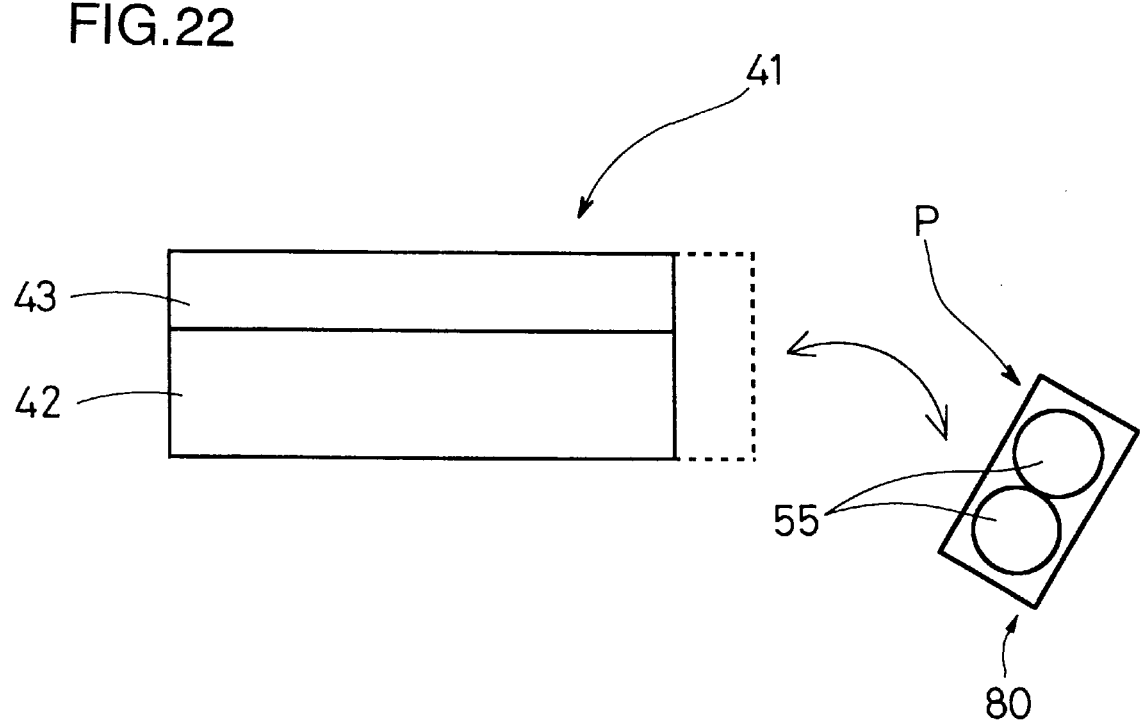
FIG. 22 is a view to indicate another modification of the second embodiment, in which a developing device is made detachable to the main body of the image forming apparatus.

If the microcapsule sheet 2 stored in the storage part 51 under the condition with inside and outside reversion based on that the sheet sensor 53 is ON and the sheet sensor 54 is OFF, the mirror image shown in FIG. 18(B) is displayed on the LC display 44. In this case, the reason thereof is as follows. Based on that the microcapsule sheet 2 is stored with inside and outside reversion, the transparent laminate sheet 14 becomes underside and the transparent base sheet 12 becomes upperside, thus light irradiated from the LC display 44 is entered from the side of the transparent laminate sheet 14 and the image formed on the microcapsule sheet 2 is seen from the side of the laminate sheet 14.

In S22, the LC display 44 is switched to the dark state and at this time, it is recognized the termination of exposure of the microcapsule sheet 2.

In S23, the LC shutter 52 is closed, and further termination sound is produced through the speaker 49 in S24, thereby it is informed to the user that image formation on the microcapsule sheet 2 is terminated. The user can recognize such termination.

In S25, on the basis of warning sound, the user holds the exposed end of the microcapsule sheet 2 and derives it from the storage part 51. At that time, the microcapsule sheet 2 is derived while being pressed between the press rollers 55, 55. While this derivation the microcapsules 15 in the image forming layer 13 are selectively ruptured according to the image formed on the microcapsule sheet 2, thereby the component flowing out of the microcapsules 15 reacts with the development material and the desirable image is formed.

Thereafter, in S26, the stopper member 65 is rotated in the clockwise direction and the engagement between the engaging part 66 and the engaging groove 63 is released. Thereby, lock of the lid member 43 against the main body 42 is released and the lid member 43 becomes rotatable. Thus, by conducting processes after S11, image formation and image printing can be again conducted. At this time, main process terminates.

As mentioned above, in the image forming apparatus 41 of the second embodiment, when the image displayed on the LC display 44 is formed on the microcapsule sheet 2, the lid member 43 is closed and the LC shutter 52 is contacted to the LC display 44. Thereby, the microcapsule sheet 2 is contacted to the LC display 44 through the LC shutter 52 therebetween, and light from the image displayed on the LC display 44 is irradiated on the microcapsule sheet 2, while controlling light quantity by open and close control of the LC shutter 52 under the condition that the microcapsule sheet 2 is contacted to the LC display 44. Finally, the image is formed on the image forming layer 13 of the microcapsule sheet 2 according to the image displayed on the LC display 44.

Accordingly, the image displayed on the LC display 44 can be formed on the microcapsule sheet 2 by simply contacting the microcapsule sheet 2 to the LC display 44. Further, the image forming apparatus 41 can be miniaturized with low cost since special mechanism is not necessary to irradiate light of the image on the microcapsule sheet 2.

Further, since the microcapsule sheet 2 and the LC display 44 are mutually contacted and locked by the lock mechanism 22 in image forming, it can prevent the image formed on the image forming layer 13 from being fluctuated and blurred, thus it can obtain the image with high quality. Since light quantity irradiated on the microcapsule sheet 2 from the LC display 44 can be controlled by the LC shutter 52, it can certainly prevent light except the light corresponding to the desirable image from being irradiated on the microcapsule sheet 2, thereby only the desirable image can be correctly formed on the microcapsule sheet 2.

The LC shutter 52 controls the light quantity irradiated from the LC display 44 on the microcapsule sheet 2 based on ON/OFF of the sensor 48 which is switched by the sensor projection 47. Therefore, for example, if it is detected by the sensor 48 that the microcapsule sheet 2 is not contacted to the LC display 44 through the LC shutter 52, light can be shut by the LC shutter 52. Therefore, it can avoid misoperation of the user of the apparatus 1 and it can prevent unnecessary image from being erroneously printed on the microcapsule sheet 2. As a result, it can avoid that the microcapsule sheet 2 is wastefully consumed by reducing misprint and improving operational efficiency.

Since termination sound is produced through the speaker 10 to inform the user of image forming termination when light is irradiated for a predetermined time on the microcapsule sheet 2 from the display 44, misprint can be reduced by preventing misoperation of the user. The user can notice the timing to conduct necessary operation after termination of the image forming, thus it can improve operational efficiency of the apparatus 41.

Further, while light is irradiated from the LC display 44 on the microcapsule sheet 2, the lid member 43 is locked and restricted open and close operation thereof based on that the engaging groove 63 of the sensor projection 47 and the engaging part 66 of the stopper member 65 are mutually engaged in the lock mechanism 62. Therefore, contact state between the microcapsule sheet 2 and the LC display 44 is unnecessarily released, as a result, it can prevent image quality from being reduced due to misoperation.

Since the LC shutter 52 is arranged between the microcapsule sheet 2 and LC display 44, only the desirable image among images displayed on the LC display 44 can be formed on the microcapsule sheet 2 by selectively controlling light irradiated on the microcapsule sheet 2 though the LC shutter 52.

In the image forming apparatus 41, a pair of press rollers 15, 15 are arranged at the one end of the main body 42 and the microcapsules 15 are selectively ruptured by the press rollers 15, 15 according to the image on the image forming layer 13, when the microcapsule sheet 2 is derived out of the storage part 51 after the image is formed on the image forming layer 13, and the dye-precursor flowing out and the development material mutually react, thereby the image is developed. Therefore, it is not necessary special development liquid or a heater. Thus, it can realize the image forming apparatus with high portability and the size thereof can be miniaturized with low cost since there is no necessity to consider heat radiation because heater is not installed.

Further, in the image forming apparatus, storing state of the microcapsule sheet 2 in the storage part 51 is judged on the basis of combination of ON/OFF signals output from the sheet sensors 53, 54. Thus, for example, if judged that output signal from the sheet sensor 53 is OFF and output signal from the sheet sensor 54 is ON, the microcapsule sheet 2 is stored in the storage part 51 under the normal condition, thus the image is normally displayed on the LC display 44. Further, if judged that output signal from the sheet sensor 53 is ON and output signal from the sheet sensor 54 is OFF, the microcapsule sheet 2 is stored in the storage part 51 under the condition with inside and outside reversion, thus the mirror image data is prepared and stored 1 by reversing top and bottom of the image data stored in the image memory 72, and the mirror image is displayed on the LC display 44 according to the mirror image data. Therefore, the image can be formed on the image forming layer 13 of the microcapsule sheet 2 regardless of storing state of the microcapsule sheet 2 in the storage part 51.

Further, in the microcapsule sheet 2, microcapsules 15 in each of which the photohardening material and the dye-precursor are enclosed and the image forming layer 13 formed of the development material are sandwiched between the base sheet 12 and the transparent laminate sheet 14. Thereby, the microcapsule sheet 2 can be easily handled after the image is formed on the image forming layer 13. Since the image forming layer 13 is protected by the base sheet 12 and the transparent laminate sheet 14, it can prevent the image forming layer 13 from being peeled off and formed deficit therein, and endurance of the image forming layer 13 can be improved.

Figure 19:
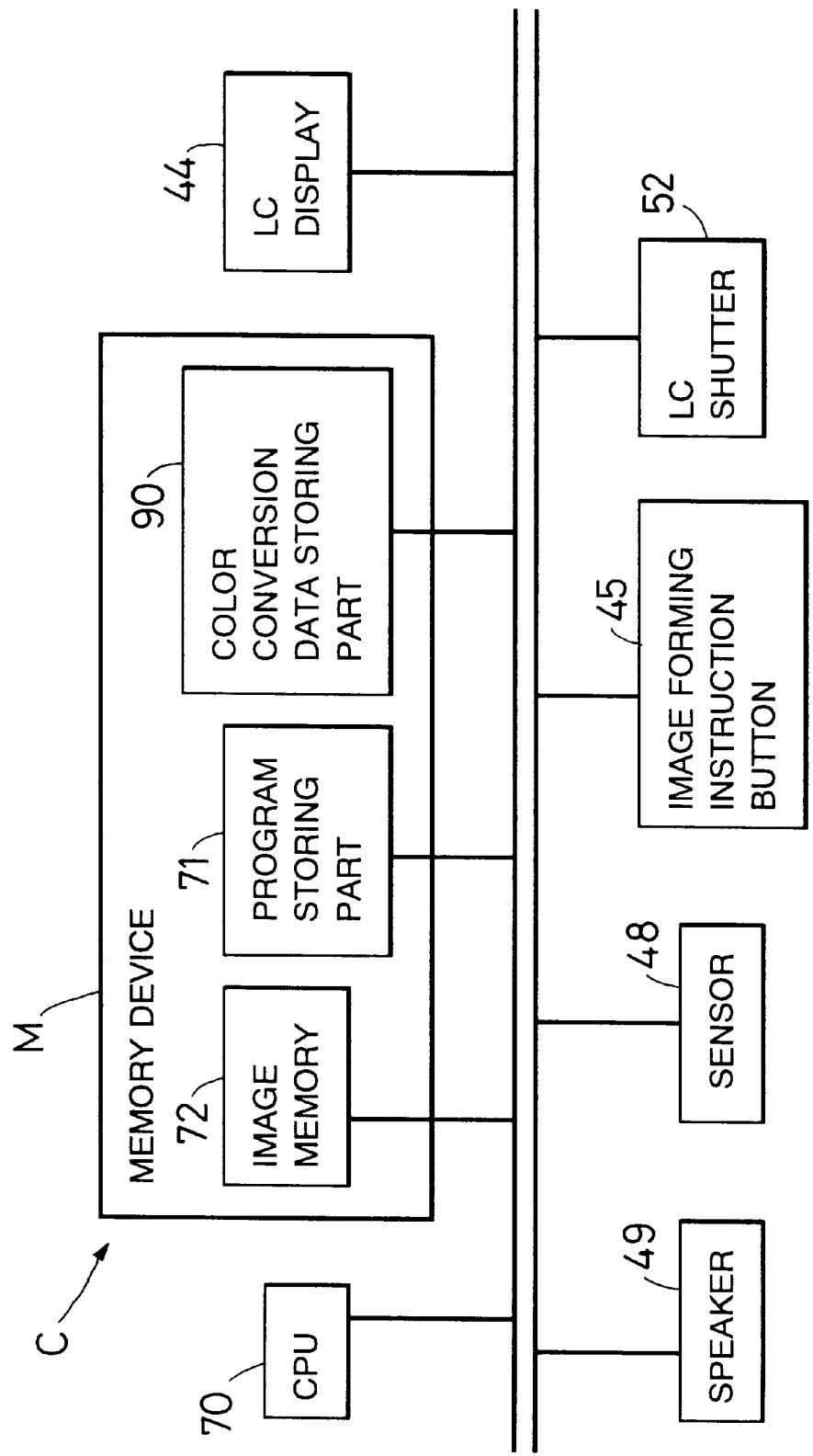
FIG. 19 is a block diagram showing control system of the image forming apparatus according to the third embodiment FIGS. 20(A), (B) show a flowchart of main program to process the image forming apparatus according to the third embodiment.

An image forming apparatus according to the third embodiment will be described with reference to FIGS. 19–21. Here, the image forming apparatus of the third embodiment has basically the same construction in both the mechanism and control system. Thus, in the following explanation, the same numbers are given to the members and elements in the third embodiment as those in the second embodiment.

First, control system of the image forming apparatus 41 according to the third embodiment will be described with reference to FIG. 19. In FIG. 19, control part C is basically constructed from the CPU 70 which has RAM and ROM. To the CPU 70, memory device M is connected. In the memory device M, there are formed program storing part 71 for storing main process program and the other various programs, image memory 72 for storing various image data and color conversion data (color conversion characteristic data) storing part 90 in which it is stored color conversion data necessary when color conversion of the image data is conducted under the second display mode that the sensor 48 is switched ON. Here, the first display mode is a mode that the image data is displayed on the LC display 44 so as to match with person's vision characteristic. The second display mode is a mode that the image data is displayed on the LC display 44 so that the image formed on the image forming layer 13 matches with person's vision characteristic when the image is formed on the image forming layer 13 of the microcapsule sheet 2 according to the image data.

Further, to the CPU 70, the image forming instruction button 45 and the sensor 48 are connected. Similarly, the speaker 49, the LC display 44 and the LC shutter 52 are connected to the CPU 70.

Figure 20A:
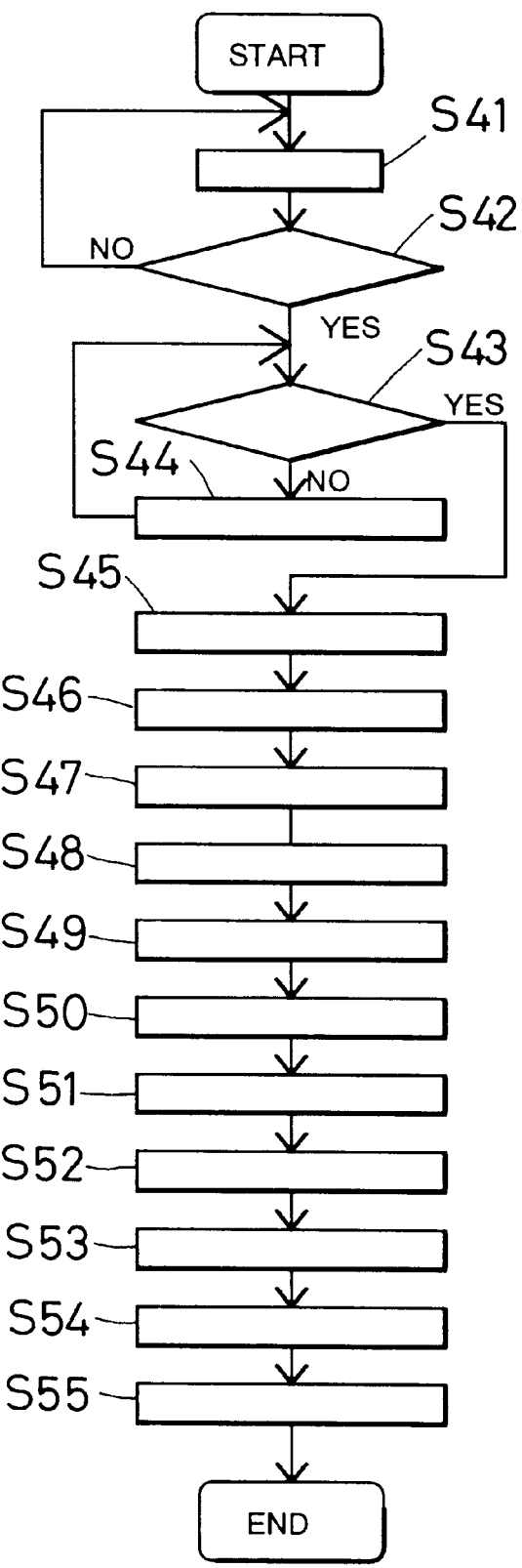

Image forming process conducted in the above constructed image forming apparatus 41 will be described with reference to FIGS. 20(A), (B). In FIGS. 20(A), (B), after the main process starts, the image data is sent and stored in the image memory 72 in S41, according to display control program stored in the program storing part 71, and the image is displayed on the LC display 44 based on the image data. In this state, the user of the apparatus 41 is preparing the image data while recognizing the image displayed on the LC display 44. At that time, the user can prepare the desirable image data by revising or changing the data through a pen input device (not shown). This state is an image data preparing stage and the lid member 43 is not contacted to the LC display 44. Thus, the image data is displayed on the LC display 44 under the first display mode. In the first display mode, the image data is displayed so as to match with person's vision characteristic.

In S42, it is judged whether the image forming button 45 is depressed or not. If the button 45 is depressed (S42: YES), procedure shifts to S43. On the other hand, if the button 45 is not depressed (S42:NO), procedure returns to S41.

In S43, it is judged whether the sensor 48 is ON or OFF. If the sensor 48 is ON (S43:YES), procedure shifts to S45, on the other hand, if the sensor 48 is OFF (S43:NO), the message "Please close lid member." is displayed on the LC display 44 in S44, thereafter procedure returns to S43. The user closes the lid member 43 according to the message. Here, if judged that the sensor 48 is ON, the display mode of the LC display 44 is changed from the first display mode to the second display mode, as mentioned hereinafter.

In S45, the image data prepared on the LC display 44 is stored in the image memory 72 and deleted from the LC display 44, thereby the display 44 is switched in the dark state. At this time, the CPU 70 recognizes the start of exposure (exposing mode).

In S46, it is conducted color conversion process of the image data stored in the image memory 72 so as to change the display mode from the first display mode to the second display mode. The color conversion process of the image data is a process that color correction of the image data is done according to color conversion data stored in the color conversion data storing part 90, so that the image formed, corresponding to the image displayed on the LC display 44, on the image forming layer 13 of the microcapsule sheet 2 matches with person's vision characteristic. The image data after color conversion is stored in the image memory 72.

As the color conversion process, it is conventionally proposed in Japanese Patent Application, Laid Open No. 59-41,227. One example of the color conversion process done in S46 will be described with reference to FIG. 21.

Figure 21A:
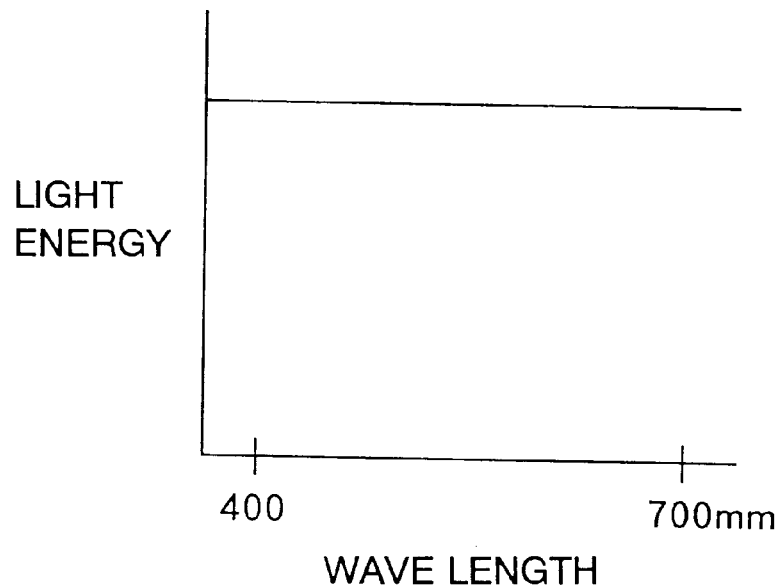
FIG. 21 is a graphs to explain a color conversion process conducted in the third embodiment.
Figure 21B:
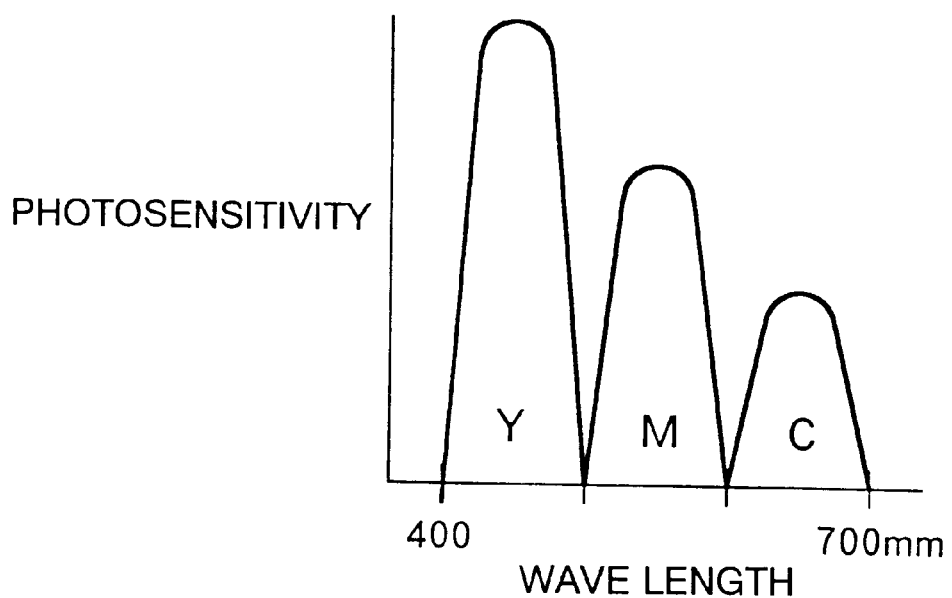

In general, white light irradiated according to the image displayed on the LC display 44 has light energy having uniform characteristic in visible radiation region, as shown in FIG. 21(A). Further, among the microcapsules 15 in the image forming layer 13 of the microcapsule sheet 2, photosensitivity of the microcapsules 15 of Yellow (Y), Magenta (M) and Cyan (C) is shown in FIG. 21(B). As understandable from FIG. 21(B), the photosensitivity becomes : Y:M:C=3:2:1 in visible radiation region. This means as follows. The cyan microcapsule needs three times of radiation light quantity against the yellow microcapsule. Similarly, the magenta microcapsule needs 1.5 times of radiation light quantity against the yellow microcapsule.

Based on the above, red data (R data), green data (G data) and blue data (B data) in the image are converted as follows, respectively. That is, the data is converted so as to be R'=R, G'=G*½, B'=B*⅓. Here, R', G' and B' are the data after color conversion, respectively, and coefficient is determined on the basis of the difference in the photosensitivity mentioned above.

At that time, the red image on the microcapsule sheet 2 is obtained according to the "self-coloring" theory when the cyan microcapsules 15 are hardened, and the coefficient of the R' data is set to 1. Similarly, the green image on the microcapsule sheet 2 is obtained when the magenta microcapsules 15 are hardened, and the coefficient of the G' data is set to ½ based on the photosensitivity of the magenta microcapsule 15 and the radiation light quantity is set to ½ of the cyan microcapsule 15. Further, the blue image on the microcapsule sheet 2 is obtained when the yellow microcapsules 15 are hardened, and the coefficient of the Be data is set to ⅓ based on the photosensitivity of the yellow microcapsule 15 and the radiation light quantity is set to ⅓ of the cyan microcapsule 15.

After the color conversion process of the image data is conducted in S46, the LC shutter 52 is opened, thereby the shutter 52 is set in the state that light can pass therethrough. Thereafter, the stopper member 65 rotates in the counter clockwise direction and the engaging part 66 engages with the engaging groove 63 of the sensor projection 47. Based on the engagement between the engaging part 66 and the engaging groove 63, the lid member 43 is restricted to open and close and locked to the main body 42 in closing state.

In S48, the image data which is converted and thereafter stored in the image memory 72 is displayed on the LC display 44 for a predetermined time. At that time, since the LC shutter 52 is opened in S47, light corresponding to the image displayed on the LC display 44 is irradiated on the microcapsule sheet 2, thereby the image forming layer 13 is exposed according to the image on the display 44 and the image is formed on the image forming layer 13. After the predetermined time elapses, in S49, the image data displayed on LC display 44 is stored in the image memory 72, thereafter the LC display 44 is switched to the dark state and at this time, it is recognized the termination of exposure of the microcapsule sheet 2.

In S50, the LC shutter 52 is closed, and further warning sound is produced through the speaker 49 in S51, thereby it is informed to the user that image formation on the microcapsule sheet 2 is terminated. The user can recognize such termination.

In S52, on the basis of warning sound, the user holds the exposed end of the microcapsule sheet 2 and derives it from the storage part 51. At that time, the microcapsule sheet 2 is derived while being pressed between the press rollers 55, 55. While this derivation the microcapsules 15 in the image forming layer 13 are selectively ruptured according to the image formed on the microcapsule sheet 2, thereby the component flowing out of the microcapsules 15 reacts with the development material and the desirable image is formed.

Thereafter, in S53, the image data before the color conversion stored in the image memory 72 is read out, and in S54 the readout image data is displayed on the LC display 44, thereby the image data is recovered in the previous state. In S55, the stopper member 65 is rotated in the clockwise direction and the engagement between the engaging part 66 and the engaging groove 63 is released. Thereby, lock of the lid member 43 against the main body 42 is released and the lid member 43 becomes rotatable. Thus, by conducting processes after S11, image formation and image printing can be again conducted. At this time, main process terminates.

As mentioned above, in the image forming apparatus 41 of the third embodiment, when the image data stored in the image memory 72 is displayed on the LC display 44, the image data is displayed on the LC display 44 according to the first display mode under the condition that the microcapsule sheet 2 is not contacted to the LC display 44 through the LC shutter 52, that is, the sensor 48 is OFF. Here, as mentioned, the first display mode is the mode that the image data is displayed on the LC display 44 so as to match with person's vision characteristic, therefore the image data is beautifully reproduced on the LC display 44 under the first display mode.

When the image data is formed on the image forming layer 13 of the microcapsule sheet 2, the microcapsule sheet 2 is contacted and locked to the LC display 44 through the LC shutter 52 by the lock mechanism 62, and the sensor 48 is switched ON. At this time, the image data is displayed on the LC display 44 according to the second display mode. Here, as mentioned, the second display mode is the mode that the image data after the color conversion is displayed on the LC display 44 so that the image matches with person's vision characteristic and is formed on the image forming layer 13, when the image is formed on the image forming layer 13 of the microcapsule sheet 2 according to the image data. Further, light is irradiated on the microcapsule sheet 2 from the LC display under the condition that the microcapsule sheet 2 is contacted to the LC display by the lock mechanism 62 while controlling light quantity through the LC shutter 52. Thereby, the image is formed on the image forming layer 13 of the microcapsule sheet 2, corresponding to the image data displayed on the LC display 44 after the color conversion is conducted. At that time, on the LC display 44 the image data after the color conversion is displayed according to the second display mode so that the image matches with person's vision characteristic and is formed on the image forming layer 13, thus the image formed on the microcapsule sheet 2 according to the image displayed on the LC display 44 becomes beautiful in matching with person's vision characteristic.

In this way, in the image forming apparatus 41 of the third embodiment, the beautiful image can be reproduced in both of one case that the image is seen on the LC display 44 and the other case that the image is seen on the microcapsule sheet 2.

Further, under the second display mode, the color conversion process is conducted for the image data, based on the color conversion data stored in the color conversion data storing part 90, and the image data after the color conversion is displayed on the LC display 44. Therefore, if the color image is displayed on the LC display 44, it can prevent color deviation between the color image displayed on the LC display 44 and the color image formed on the microcapsule sheet 2 from being produced, thus beautiful color image can be formed on the microcapsule sheet 2. Since the color conversion data necessary to conduct color conversion is stored in the color conversion data storing part 90, the color conversion process can be fast conducted without complex program for color conversion, when displaying the color image on the LC display 44 under the second display mode.

In the apparatus 41, the display mode of the image data on the LC display 44 is changed between the first display mode and the second display mode based on ON/OFF state of the sensor 48. Therefore, if the microcapsule sheet 2 is contacted to the LC display 44, it can prevent the image data from being displayed on the LC display 44 under the second display mode, and it can prevent the image displayed on the LC display 44 under the first display mode from being formed on the microcapsule sheet 2.

When instruction is output from the image forming instruction button 45 and it is detected by the sensor 48 that the microcapsule sheet 2 is contacted to the LC display 44, the display mode is changed to the second display mode. Therefore, similar to the above, if the microcapsule sheet 2 is contacted to the LC display 44, it can prevent the image data from being displayed on the LC display 44 under the second display mode, and it can prevent the image displayed on the LC display 44 under the first display mode from being formed on the microcapsule sheet 2.

While the invention has been particularly shown and described with reference to preferred embodiments thereof, it will be understood by those skilled in the art that the foregoing and other changes in form and details can be made therein without departing from the spirit and scope of the invention.

For example, though warning sound is produced through the speaker 10 if necessary in the first embodiment, it is conceivable that CCD is arranged on the lower surface of the case 3 and various conditions are informed to the user by changing the lightening state of CCD when the LC shutter 9 is opened and closed. Further, it is conceivable that termination of open state of the LC shutter 9 is informed to the user by oscillating the apparatus though a piezoelectric element when open state of the LC shutter 9 is terminated.

For example, in the second embodiment, though the press rollers 55, 55 are fixedly arranged to the image forming apparatus 41, it is conceivable to utilize a developing device P in which the press rollers 55, 55 are arranged in a case 80 and to construct the developing device P detachably to the image forming apparatus 41. In this way, if the developing device P is constructed so as to be detachable to the image forming apparatus 41, the storage part 51 can be miniaturized with low cost.

Though warning sound is produced through the speaker 10 if necessary in the second embodiment, it is conceivable as in the first embodiment that CCD is arranged on the lower surface of the main body 2 and various conditions are informed to the user by changing the lightening state of CCD when the LC shutter 9 is opened and closed. Further, it is conceivable that termination of open state of the LC shutter 9 is informed to the user by oscillating the apparatus though a piezoelectric element when open state of the LC shutter 9 is terminated.

Further, in the third embodiment, though it is conducted in the color conversion process control for changing luminous strength every R data, G data and B data based on photosensitivity of the microcapsules 15, it is conceivable that irradiating time of R data, G data and B data is controlled. Concretely, after the LC shutter 52 is opened, all of R data, G data and B data is displayed on the LC display 44. Thereafter, display of B data is terminated after a predetermined time, and display of G data is terminated after a predetermined time from termination of B data, and further display of R data is terminated after a predetermined time from termination of G data. Thereafter, the LC shutter 52b is shut. By this control, irradiating time of each of R data, G data and B data can be changed step by step.

What is claimed is:
1. An image forming apparatus comprising:
a main body for storing a photo-sensitive recording medium on which a photosensitive image forming layer is formed;
a contact plane on which an image display arranged in an external apparatus is contacted, the contact plane being formed on the main body;
a control device for controlling light quantity irradiated on the photo-sensitive recording medium from the image display of the external apparatus according to an image displayed thereon, the control device being arranged on the contact plane;
image forming means for forming the image on the photo-sensitive image forming layer on the basis of light irradiated thereon while controlling light quantity by the control device and contacting the image display to the contact plane; and
a detection device for detecting whether the image display is contacting the contact plane.

2. The image forming apparatus according to claim 1, wherein the control device comprises a liquid crystal shutter which controls light quantity by opening and closing thereof.

3. The image forming apparatus according to claim 2, wherein the liquid crystal shutter is arranged on the upper side of the main body and the contact plane is formed on an upper surface of the liquid crystal shutter.

4. The image forming apparatus according to claim 1, wherein the control device controls light quantity irradiated from the image display on the photo-sensitive recording medium based on a result detected by the detection device.

5. The image forming apparatus according to claim, 1, wherein the detection device includes a pair of detecting buttons arranged at one end of the main body.

6. The image forming apparatus according to claim 1, further comprising an information device for producing a warning sound when detected by the detection device that the image display is not contacting to the contact plane.

7. The image forming apparatus according to claim 1, wherein the image forming layer in the photo-sensitive recording medium comprises microcapsules including light hardening material hardened by light with a predetermined wave length and dye-precursor therein, and development material coloring the dye-precursor.

8. The image forming apparatus according to claim 7, wherein the image forming layer is sandwiched between a first sheet and a second sheet.

9. The image forming apparatus according to claim 8, wherein at least one of the first sheet and the second sheet is made of transparent material.

10. The image forming apparatus according to claim 7, further comprising a press device for pressing the image formed on the photo-sensitive image forming layer, wherein the image is developed by rupturing the microcapsules not exposed through light and reacting the dye-precursor and the developing material when pressed by the press device.

11. The image forming apparatus according to claim 10, wherein one end of the photo-sensitive recording medium is exposed out of the main body and the image on the photo-sensitive image forming layer is developed by the press device when the recording medium is derived from the main body through the one end.

12. The image forming apparatus according to claim 6, further comprising judgment means for judging whether the photo-sensitive recording medium is stored in the main body under a state capable of image forming.

13. The image forming apparatus according to claim 12, wherein the judgement means includes a pair of sheet sensors.

14. An image forming apparatus comprising:
a storing member for storing a photo-sensitive recording medium on which a photo-sensitive image forming layer is formed;
an image display for displaying an image thereon, the display being arranged on a main body;
a fixing device for fixing the photo-sensitive recording medium to the image display while mutually contacting both the photo-sensitive recording medium and the image display;
a control device for controlling light quantity from the image display according to the image displayed thereon, the control device being arranged on the storing member;

image forming means for forming an image on the photo-sensitive image forming layer on the basis of light irradiated thereon while controlling light quantity by the control device; and an information device for producing a termination sound indicating termination of image formation after light is irradiated in the photo-sensitive recording medium for a predetermined time.

15. The image forming apparatus according to claim 14, wherein the image forming layer in the photosensitive recording medium comprises microcapsules including light hardening material hardened by light with a predetermined wave length and dye-precursor therein, and development material coloring the dye-precursor.

16. The image forming apparatus according to claim 15, further comprising a press device for pressing the image formed on the photo-sensitive image forming layer, wherein the image is developed by rupturing the microcapsules not exposed through light and reacting the dye-precursor and the developing material when pressed by the press device.

17. The image forming apparatus according to claim 16, wherein the press device is constructed detachably to the storing member.

18. The image forming apparatus according to claim 14, further comprising image data storing means for storing image data of the image to be displayed on the image display;

judgment means for judging storing state of the photo-sensitive recording medium in the storing member; and display control means for preparing mirror image data of the image data stored in the image data storing means by reversing left and right thereof and for controlling the image display to display the mirror image data thereon.

19. The image forming apparatus according to claim 14, wherein the fixing device comprises a lock mechanism for locking the storing member and the main body.

20. The image forming apparatus according to claim 19, further comprising detection device for detecting whether the photo-sensitive recording medium is contacted to the image display, wherein the lock mechanism locks the storing member to the main body after the detection device detects that the photo-sensitive recording medium is contacted to the image display.

21. An image forming apparatus comprising:

a storing member for storing a photo-sensitive recording medium on which a photo-sensitive image forming layer is formed;

image data storing means for storing image data of an image to be formed on the photo-sensitive image forming layer;

an image display for displaying the image data stored in the image data storing means thereon, the image display being arranged on a main body;

a fixing device for fixing the photo-sensitive recording medium to the image display while mutually contacting both the photo-sensitive recording medium and the image display;

a light control device for controlling light quantity irradiated on the photosensitive recording medium from the image display according to the image display thereon, the light control device being arranged on the storing member; and display control means for controlling the image display to display the image data according to a first display mode under which the image data is displayed on the image display so as to match with a person's vision when the photo-sensitive recording medium is not contacting the image display and to display the image data according to a second display mode under which the image data is displayed on the image display so that the image corresponding to the image data matches with the person's vision after being formed on the photo-sensitive recording medium when the photo-sensitive recording medium is contacting the image display.

22. The image forming apparatus according to claim 21, further comprising conversion characteristic storing means for storing conversion characteristic used for converting the image data corresponding to the second display mode; and conversion means for converting the image data stored in the image data storing means on the basis of the conversion characteristic stored in the conversion characteristic storing means;

wherein the display control means controls the image display to display the image data converted by the conversion means under the second display mode.

23. The image forming apparatus according to claim 21, further comprising detection device for detecting whether the photo-sensitive recording medium is contacted to the image display.

24. The image forming apparatus according to claim 23, wherein the display control means changes display mode to the first display mode or the second display mode based on a result detected by the detection device.

25. The image forming apparatus according to claim 24, further comprising instruction means for instructing light irradiation on the photo-sensitive recording medium from the image display according to the image displayed thereon.

26. The image forming apparatus according to claim 25, wherein the display control means changes the display mode to the second display mode when the instruction means instructs to conduct light irradiation and the detection device detects that the photo-sensitive recording medium is contacted to the image display.

* * * * *